(12) United States Patent
Kimura

(10) Patent No.: US 12,487,712 B2
(45) Date of Patent: Dec. 2, 2025

(54) DISPLAY DEVICE

(71) Applicant: Sony Group Corporation, Tokyo (JP)

(72) Inventor: Kei Kimura, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/865,579

(22) PCT Filed: May 18, 2023

(86) PCT No.: PCT/JP2023/018631
§ 371 (c)(1),
(2) Date: Nov. 13, 2024

(87) PCT Pub. No.: WO2023/243302
PCT Pub. Date: Dec. 21, 2023

(65) Prior Publication Data
US 2025/0315131 A1    Oct. 9, 2025

(30) Foreign Application Priority Data
Jun. 17, 2022   (JP) .................. 2022-097923

(51) Int. Cl.
*G06F 3/041*    (2006.01)
*G06F 3/042*    (2006.01)

(52) U.S. Cl.
CPC ........ *G06F 3/0421* (2013.01); *G06F 3/04166* (2019.05)

(58) Field of Classification Search
None
See application file for complete search history.

(56) References Cited

U.S. PATENT DOCUMENTS 10,469,784 B2* 11/2019 Tate .................. H04N 25/532
2005/0275647 A1* 12/2005 Numao ................ G09G 3/325
 345/204
2021/0035525 A1* 2/2021 Koyama ............. H10D 86/423

FOREIGN PATENT DOCUMENTS

JP   2001060076 A   3/2001
JP   2004070293 A   3/2004
(Continued)

OTHER PUBLICATIONS

International Search Report (PCT/ISA/210), International Application No. PCT/JP2023/018631, dated Jul. 18, 2023.

*Primary Examiner* — Krishna P Neupane
(74) *Attorney, Agent, or Firm* — Michael Best & Friedrich LLP

(57) ABSTRACT

Display devices with simplified duty driving are disclosed. In one example, a display device includes a pixel array, row signal lines, data lines, and a vertical drive circuit. In the pixel array, pixels including a light emitting element and a pixel circuit are arranged in rows and columns. The row signal lines respectively transmit control signals for the pixel circuits in respective rows. The data lines respectively transmit image signal for respective columns. The vertical drive circuit generates the control signals for line-sequentially driving the pixels and via the row signal lines. The vertical drive circuit includes a decode circuit that outputs a selection signal to the row selected according to an input address signal and outputs the selection signals according to the address signals input every horizontal scanning period in the line-sequential driving and generates a control signal based on the output selection signals.

9 Claims, 26 Drawing Sheets

(56) References Cited

FOREIGN PATENT DOCUMENTS

| | | | |
|---|---|---|---|
| JP | 2009047818 | A | 3/2009 |
| JP | 2009237041 | A | 10/2009 |
| JP | 2016170385 | A | 9/2016 |
| JP | 2023044353 | A | 3/2023 |

* cited by examiner

DISPLAY DEVICE

FIELD

The present disclosure relates to a display device.

BACKGROUND

A self-luminous display device having a pixel array unit in which pixels each including a light emitting element by organic EL are arranged in a two-dimensional matrix is used. In such a pixel array unit, light emission is controlled by line-sequential driving. This line-sequential driving is a driving method of sequentially executing writing of display data and driving of causing the pixels to emit light in units of rows. For example, a display device that sequentially selects rows by a shift register and performs line-sequential driving has been proposed (see, for example, Patent Literature 1).

CITATION LIST

Patent Literature

Patent Literature 1: JP 2009-047818 A

SUMMARY

Technical Problem

However, in the above-described conventional technology, there is a problem that it is difficult to locally refresh a panel of the pixel array unit or to perform bundle driving for simultaneously driving pixels of a plurality of rows. This is because it is difficult to select an arbitrary row in the shift register. Therefore, a display device that performs line-sequential driving by a decoder that selects a row based on an input address instead of the shift register has been proposed. On the other hand, in the self-luminous display device such as an organic EL display device, duty driving is performed in order to reduce afterimage feeling at the time of moving image display. This duty driving is a driving method in which light emission and non-light emission periods are alternately provided in a period of one frame. In this duty driving, scanning for stopping light emission is required in addition to scanning for starting light emission. When the duty driving is performed, decoders for the plurality of times of scanning are required, and there is a problem that the configuration of the display device becomes complicated.

Therefore, the present disclosure proposes a display device that performs duty driving and has a simplified configuration.

Solution to Problem

A display device according to the present disclosure includes a pixel array unit, a plurality of row signal lines, a plurality of data lines, and a vertical drive unit. In the pixel array unit, a plurality of pixels including a light emitting element and a pixel circuit that causes the light emitting element to emit light according to an image signal are arranged in a two-dimensional matrix. The plurality of row signal lines are arranged for each of rows in the pixel array unit and transmit a control signal of the pixel circuit. The plurality of data lines are arranged for each of columns in the pixel array unit and transmit the image signal. The vertical drive unit generates a control signal for line-sequentially driving the pixels of the pixel array unit and supplies the control signal to the pixels for each of the rows via the row signal line. The vertical drive unit includes a decode circuit that outputs a selection signal to the row selected according to an input address signal and outputs a plurality of the selection signals according to a plurality of the address signals input every horizontal scanning period in the line-sequential driving, and generates a control signal based on the plurality of output selection signals.

DESCRIPTION OF EMBODIMENTS

Figure 1:
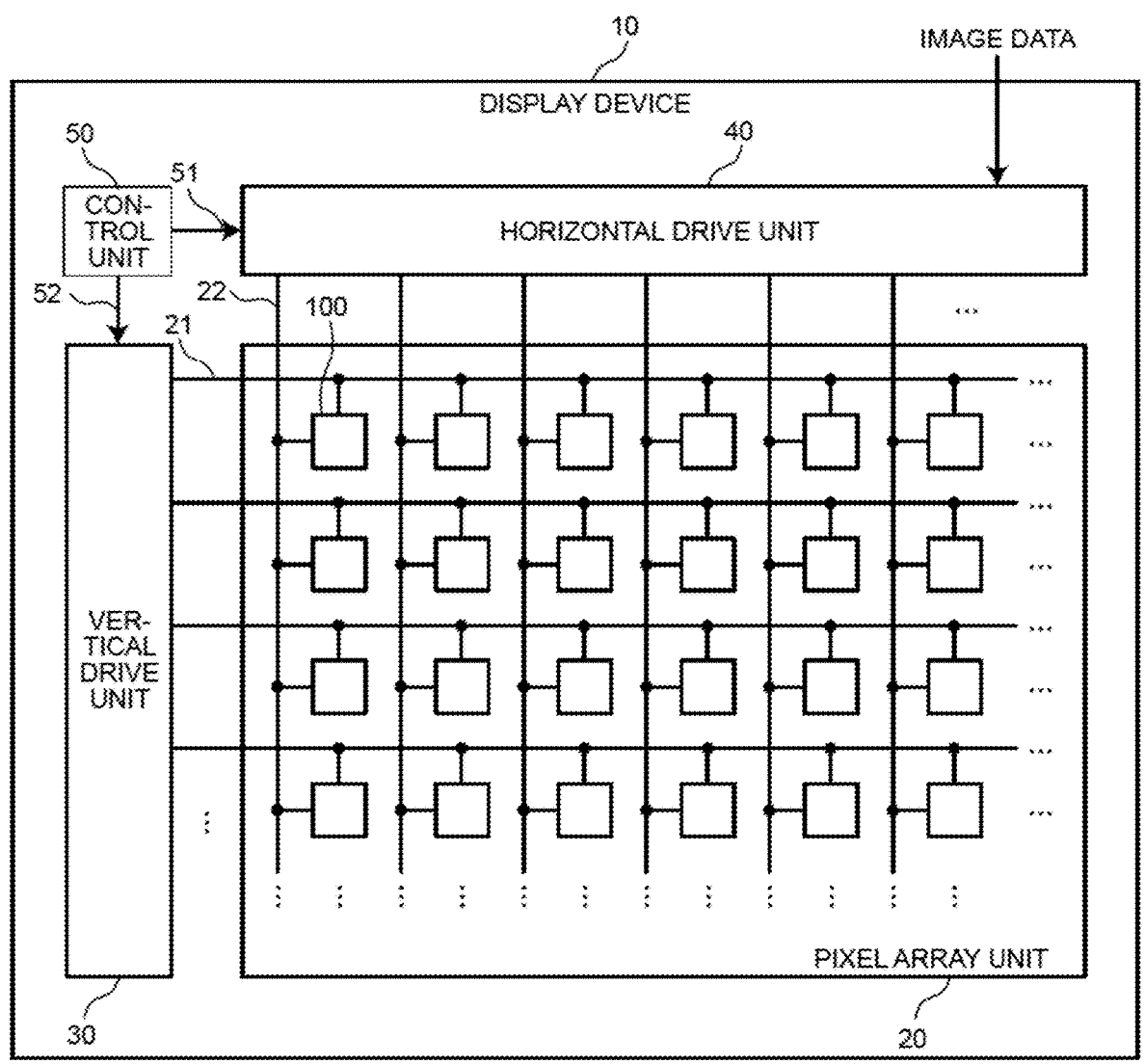
FIG. 1 is a diagram illustrating a configuration example of a display device according to an embodiment of the present disclosure.

Hereinafter, embodiments of the present disclosure will be described in detail with reference to the drawings. The description will be given in the following order. Note that in the following embodiments, the same parts are denoted by the same reference numerals, and redundant description will be omitted.

1. First Embodiment
2. Second Embodiment
3. Third Embodiment
4. Fourth embodiment
5. Fifth Embodiment
6. Modifications
7. Application Examples

1. FIRST EMBODIMENT

[Configuration of Display Device]

FIG. 1 is a diagram illustrating a configuration example of a display device according to an embodiment of the present disclosure. The drawing is a block diagram illustrating a configuration example of a display device 10. The display device 10 displays an image based on image data input from the outside. The display device 10 includes a pixel array unit 20, a horizontal drive unit 40, a vertical drive unit 30, and a control unit 50.

The pixel array unit 20 is configured by arranging a plurality of pixels 100. The pixel array unit 20 in the drawing illustrates an example in which the plurality of pixels 100 are arranged in a form of a two-dimensional matrix. Here, the pixel 100 includes a light emitting element and a pixel circuit that causes the light emitting element to emit light, and emits light with luminance corresponding to an input image signal. As this light emitting element, for example, an organic EL element can be used.

A row signal line 21 and a data line 22 are wired to each of the pixels 100. The row signal line 21 transmits a control signal of the pixel circuit. The data line 22 transmits an image signal. Note that the row signal line 21 is arranged for each row in the form of the two-dimensional matrix, and is commonly wired to the plurality of pixels 100 arranged in one row. The data line 22 is arranged for each column in the form of the two-dimensional matrix, and is commonly wired to the plurality of pixels 100 arranged in one column.

The vertical drive unit 30 generates the control signal of the pixel 100 described above. The vertical drive unit 30 in the drawing generates the control signal for each row of the two-dimensional matrix of the pixel array unit 20, and sequentially outputs the control signal via the row signal line 21.

The horizontal drive unit 40 generates the image signal of the pixel 100, and outputs the generated image signal to the pixel 100. The horizontal drive unit 40 in the drawing outputs the image signal for each column of the pixel array unit 20 via the data line 22. Note that the image signal is also referred to as a video signal or a luminance signal.

The control unit 50 controls the vertical drive unit 30 and the horizontal drive unit 40. The control unit 50 in the drawing outputs control signals via signal lines 51 and 52, respectively, to control the vertical drive unit 30 and the horizontal drive unit 40.

[Configuration of Pixel]

Figure 2:
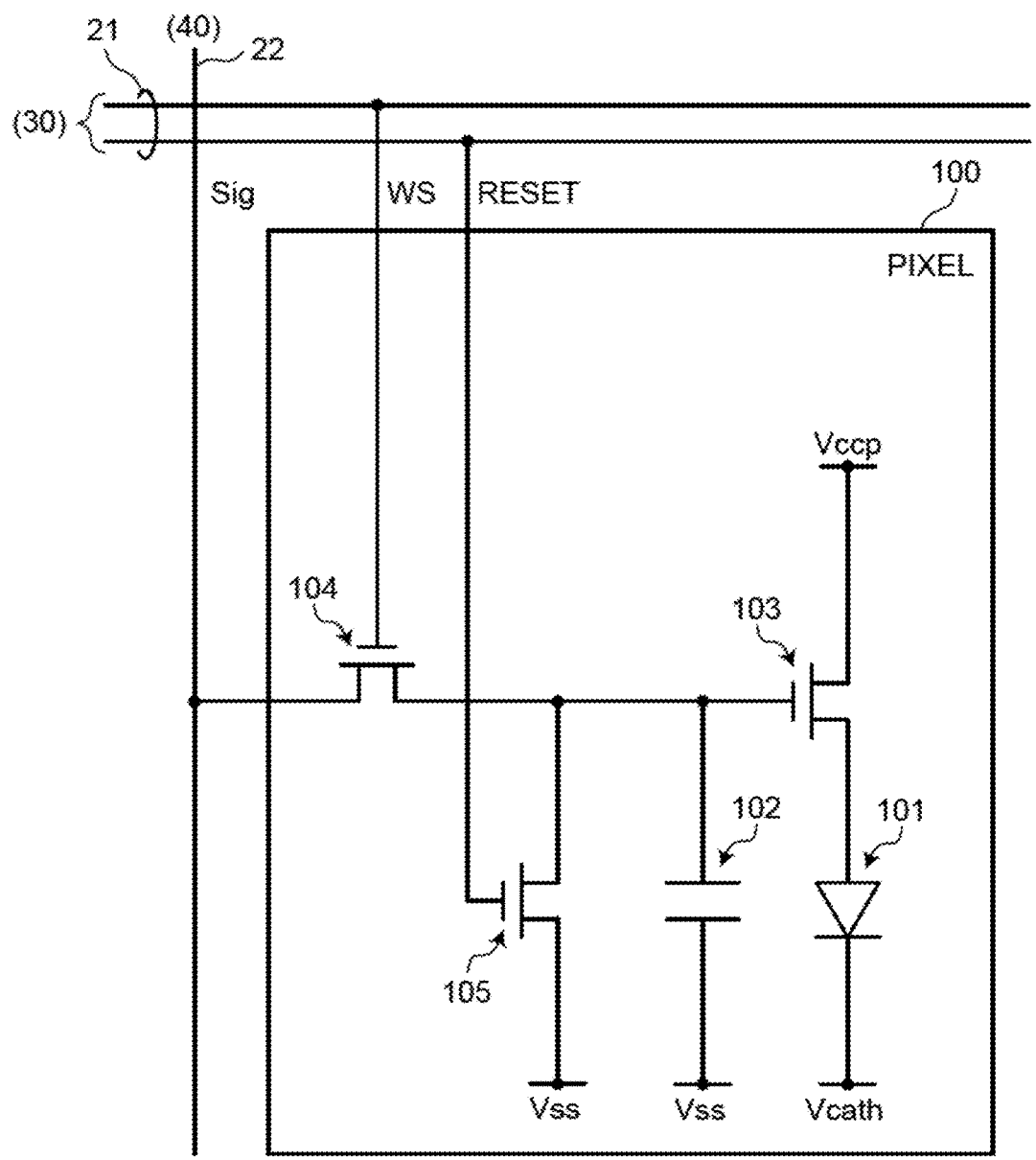
FIG. 2 is a diagram illustrating a configuration example of a pixel according to a first embodiment of the present disclosure.

FIG. 2 is a diagram illustrating a configuration example of a pixel according to a first embodiment of the present disclosure. The drawing is a circuit diagram illustrating a configuration example of the pixel 100. The pixel 100 includes a light emitting element 101, a drive transistor 103, a sampling transistor 104, a reset transistor 105, and a holding capacitor 102. For the drive transistor 103, the sampling transistor 104, and the reset transistor 105, n-channel MOS transistors can be used. Note that the MOS transistor can be made conductive by applying a gate-source voltage Vgs exceeding a threshold voltage Vth to a gate. The gate-source voltage Vgs to bring the MOS transistor into a conduction state is referred to as an on-voltage. In the n-channel MOS transistor, the on-voltage applied to the gate is a high voltage with respect to a source.

A signal line WS, a signal line RESET, and a signal line Sig are wired to the pixel 100. The signal line WS and the signal line RESET constitute the row signal line 21 described above. The signal line Sig constitutes the data line 22 described above. Furthermore, a power supply line Vccp, a power supply line Vss, and a power supply line Vcath are further wired to the pixel 100.

A cathode of the light emitting element 101 is connected to the power supply line Vcath, and an anode is connected to a source of the drive transistor 103. A drain of the drive transistor 103 is connected to the power supply line Vccp, and a gate is connected to a drain of the sampling transistor 104, a drain of the reset transistor 105, and one end of the holding capacitor 102. The other end of the holding capacitor 102 is connected to the power supply line Vss. A source of the sampling transistor 104 is connected to the signal line Sig, and a gate is connected to the signal line WS. A source of the reset transistor 105 is connected to the power supply line Vss, and a gate is connected to the signal line RESET.

Note that a circuit including the drive transistor 103, the sampling transistor 104, and the holding capacitor 102 of the pixel 100 constitutes a pixel circuit. That is, the circuit other than the light emitting element 101 in the pixel 100 constitutes the pixel circuit. This pixel circuit is a circuit that drives the light emitting element 101 by causing a current to flow through the light emitting element 101.

As the light emitting element 101, for example, an organic EL element can be used. The light emitting element 101 emits light having luminance corresponding to the current flowing therethrough.

The drive transistor 103 is a transistor that drives the light emitting element 101 by causing a current to flow therethrough.

The sampling transistor 104 is a transistor that samples the image signal transmitted by the signal line Sig and writes the image signal into a gate node (gate electrode) of the drive transistor 103. Note that the expression "write" here indicates that an image signal voltage is applied to the gate node, and the potential of the gate node is held at a potential based on the image signal voltage. The sampling transistor 104 is controlled by a control signal transmitted by the signal line WS.

The holding capacitor 102 is a capacitor that holds the image signal voltage Vsig written by sampling by the sampling transistor 104. The drive transistor 103 drives the light emitting element 101 by causing a drive current corresponding to a holding voltage of the holding capacitor 102 to flow through the light emitting element 101.

The reset transistor 105 is a transistor that discharges the image signal voltage Vsig held in the holding capacitor 102 to make the drive transistor 103 non-conductive and stops light emission of the light emitting element 101. The reset transistor 105 is controlled by a control signal transmitted by the signal line RESET.

[Configuration of Vertical Drive Unit]

Figure 3:
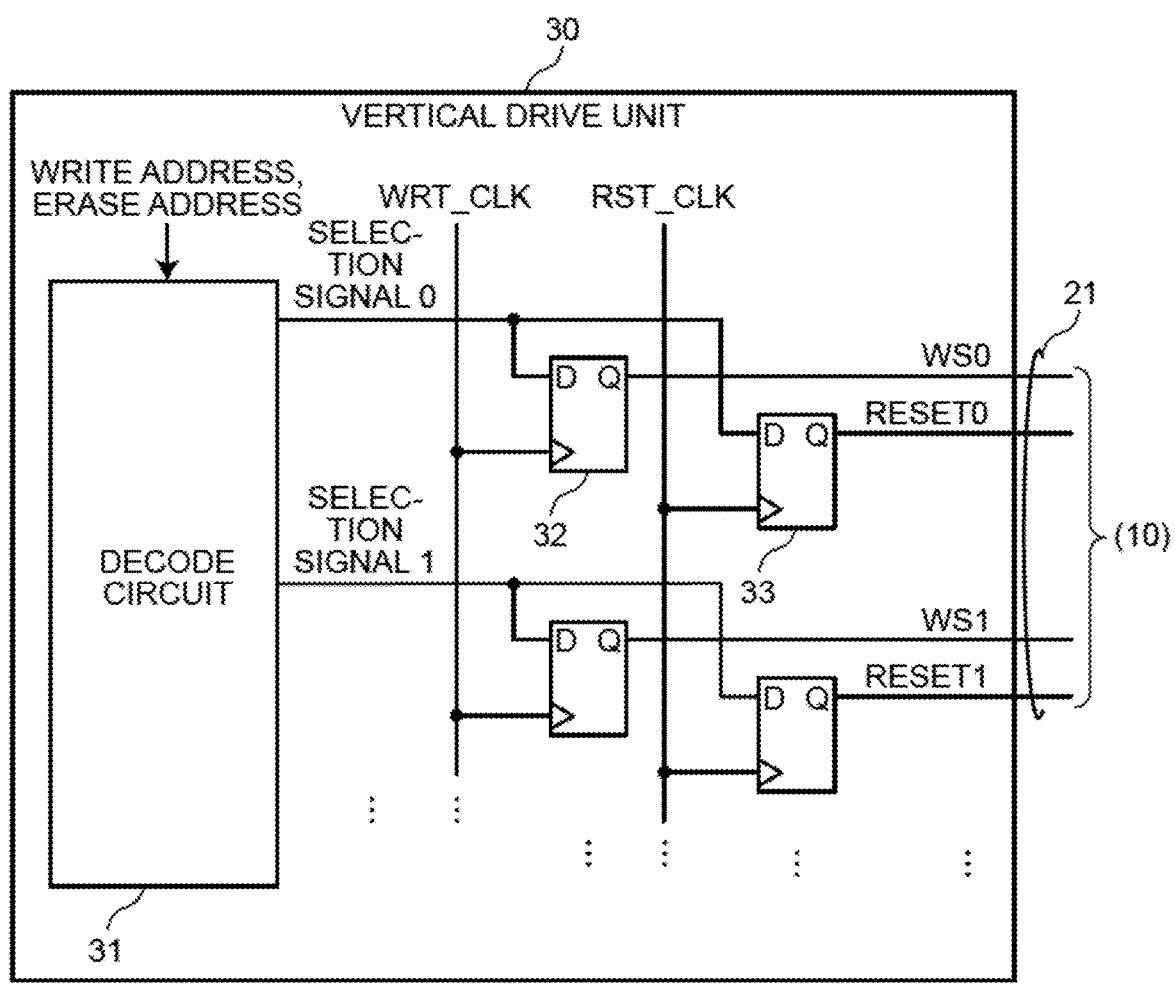
FIG. 3 is a diagram illustrating a configuration example of a vertical drive unit according to the first embodiment of the present disclosure.

FIG. 3 is a diagram illustrating a configuration example of a vertical drive unit according to the first embodiment of the present disclosure. The drawing is a block diagram illustrating a configuration example of the vertical drive unit 30. The vertical drive unit 30 outputs the control signal to the signal line WS and the signal line RESET arranged for each row of the pixel array unit 20. In the drawing, the numbers added to "SELECTION SIGNAL", "WS", "RESET", and the like represent the corresponding rows of the pixel array unit 20. For convenience, the row of the pixel array unit 20 is identified by a number starting from "0". The vertical drive unit 30 includes a decode circuit 31 and latch circuits 32 and 33. Furthermore, a signal line WRT_CLK and a signal line RES_CLK for transmitting clock signals are arranged.

The decode circuit 31 selects a row of the pixel array unit 20 according to an input address signal. The decode circuit 31 outputs a selection signal to a signal line corresponding to the selected row. That is, the decode circuit 31 includes the same number of signal lines as the number of rows of the pixel array unit 20, and outputs the selection signal. A write address signal and an erase address signal are input to the decode circuit 31. The write address signal is a signal representing an address of a row on which writing is performed. The erase address signal is a signal representing an address of a row in which light emission of the light emitting element 101 is stopped. The light emission can be stopped by discharging the holding capacitor 102.

The latch circuits 32 and 33 are arranged for each row of the pixel array unit 20 and hold the selection signal in synchronization with the clock signal. The latch circuits 32 and 33 can include, for example, D flip-flops. The latch circuit 32 holds the selection signal in synchronization with a WRT_CLK signal, which is a clock signal transmitted by the signal line WRT_CLK. A signal of a Q output of the latch circuit 32 corresponds to a write selection signal that is a selection signal representing a row of the pixel array unit 20 on which writing is performed. The Q output of the latch circuit 32 is connected to the signal line WS. The latch circuit 33 holds the selection signal in synchronization with an RST_CLK signal, which is a clock signal transmitted by the signal line RES_CLK. A signal of a Q output of the latch circuit 33 corresponds to a light emission control selection signal that is a selection signal representing a row of the pixel array unit 20 on which control of a light emission current is performed. The Q output of the latch circuit 33 is connected to the signal line RESET.

The address signal and the clock signal are generated and output by the control unit 50 in FIG. 1, for example.

[Configuration of Decode Circuit]

Figure 4:
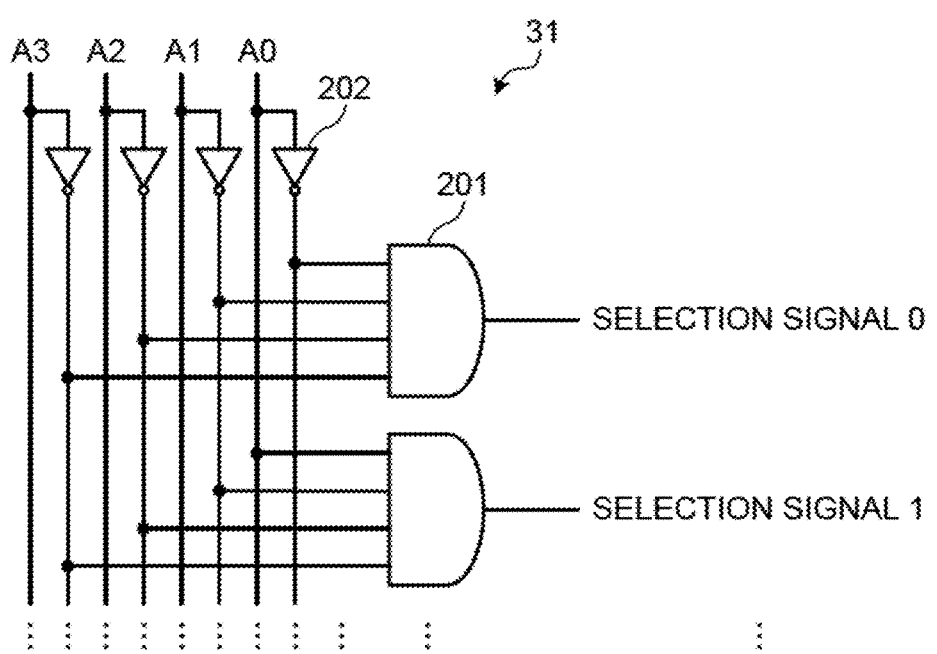
FIG. 4 is a diagram illustrating a configuration example of a decode circuit according to an embodiment of the present disclosure.

FIG. 4 is a diagram illustrating a configuration example of a decode circuit according to the embodiment of the present disclosure. The drawing is a circuit diagram illustrating a configuration example of the decode circuit 31. The decode circuit 31 in the drawing includes four inverting gates 202 and AND gates 201 arranged for each row of the pixel array unit 20. In the drawing, "A0", "A1", "A2", and "A3" represent address signals. The address signal in the drawing is assumed to be a 4-bit signal. A signal (bit value) corresponding to an address of a row of the pixel array unit 20 among the 4-bit address signals is input to an input of each AND gate 201. As a result, only the AND gate 201 corresponding to the address of the row of the pixel array unit 20 outputs a signal. The output signal of the AND gate 201 corresponds to the selection signal.

[Driving Method]

Figure 5:
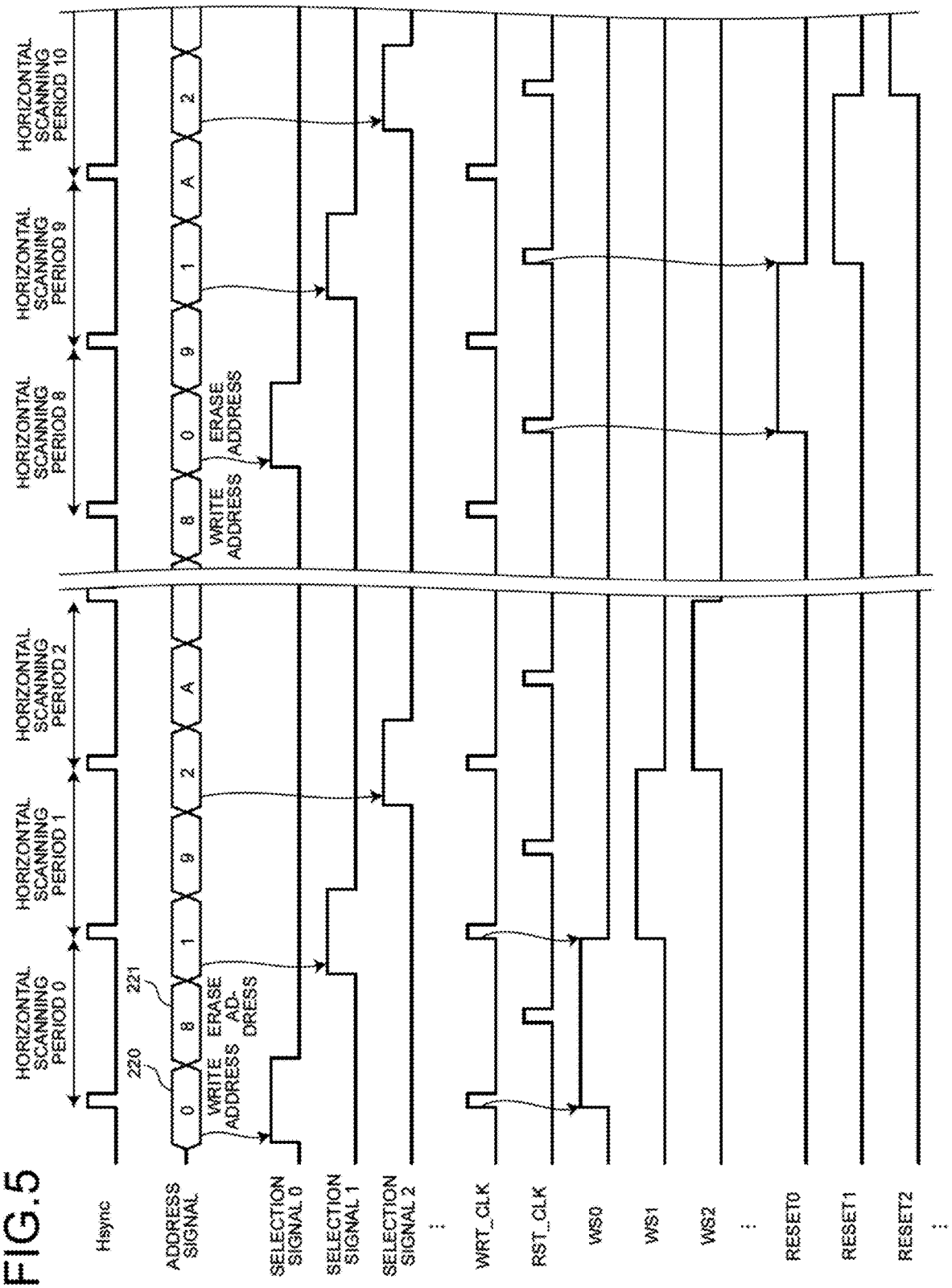
FIG. 5 is a diagram illustrating an example of a driving method according to the first embodiment of the present disclosure.

FIG. 5 is a diagram illustrating an example of a driving method according to the first embodiment of the present disclosure. The drawing is a timing chart illustrating an example of a driving method of the light emitting element 101 in the pixel 100. "Hsync" in the drawing is a signal representing a horizontal scanning period in the line-sequential driving. "HORIZONTAL SCANNING PERIOD" in the drawing represents the horizontal scanning period. Note that the number added to the "HORIZONTAL SCANNING PERIOD" identifies a vertical scanning period. For example, "HORIZONTAL SCANNING PERIOD 0" represents the first horizontal scanning period in the vertical scanning period.

"ADDRESS SIGNAL" represents an address signal input to the decode circuit 31. "SELECTION SIGNAL" represents a selection signal output from the decode circuit 31. This selection signal indicates a state in which a portion of "1" of a binarized signal is selected. "WRT_CLK" and "RST_CLK" represent the clock signals described in FIG. 3. "WS" and "RESET" represent the control signals of the signal line WS and the signal line RESET. The portion of "1" of these binarized control signals represents the on-voltage described above. On the other hand, a portion of "0" represents an off-voltage.

As illustrated in the drawing, a write address 220 and an erase address 221 are input to the decode circuit 31 every horizontal scanning period. The row of the pixel array unit 20 corresponding to these addresses is selected, and the selection signals are output. For example, when a value "0" is input as the write address and the erase address, the selection signal 0 transitions to "1". The output selection signal is held in the latch circuit 32 at the rise of WRT_CLK, and is output as the control signal to the signal line WS. Similarly, the output selection signal is held in the latch circuit 33 at the rise of RST_CLK, and is output as the control signal to the signal line RESET.

When the control signal of "1" is input to the signal line WS, the sampling transistor 104 of the pixel 100 described in FIG. 2 is conducted, and the image signal of the signal line Sig is written into the holding capacitor 102. A light emission current corresponding to the written image signal flows through the drive transistor 103 and is supplied to the light emitting element 101. As described above, in the pixel 100 of FIG. 2, light emission of the light emitting element 101 is started at the same time as writing. Thereafter, when the control signal of "1" is input to the signal line RESET of the pixel 100 in the row on which writing has been performed, the reset transistor 105 of the pixel 100 in FIG. 2 is conducted, and the image signal written into the holding capacitor 102 is discharged. As a result, the drive transistor 103 of the pixel 100 is brought into a non-conductive state, and light emission of the light emitting element 101 is stopped.

The selection signal selected by the write address corresponds to a write selection signal representing a row of the pixel array unit 20 on which writing is performed. Furthermore, the selection signal selected by the erase address corresponds to a light emission control selection signal representing a row on which the control of the light emission current is performed.

As described above, the plurality of address signals are input to the decode circuit 31 in one horizontal scanning period, and the selection signals of the corresponding row are output. These selection signals are taken into and held in the latch circuits 32 and 33 at different timings by the plurality of clock signals (WRT_CLK and RST_CLK).

[Light Emission Driving]

Figure 6:
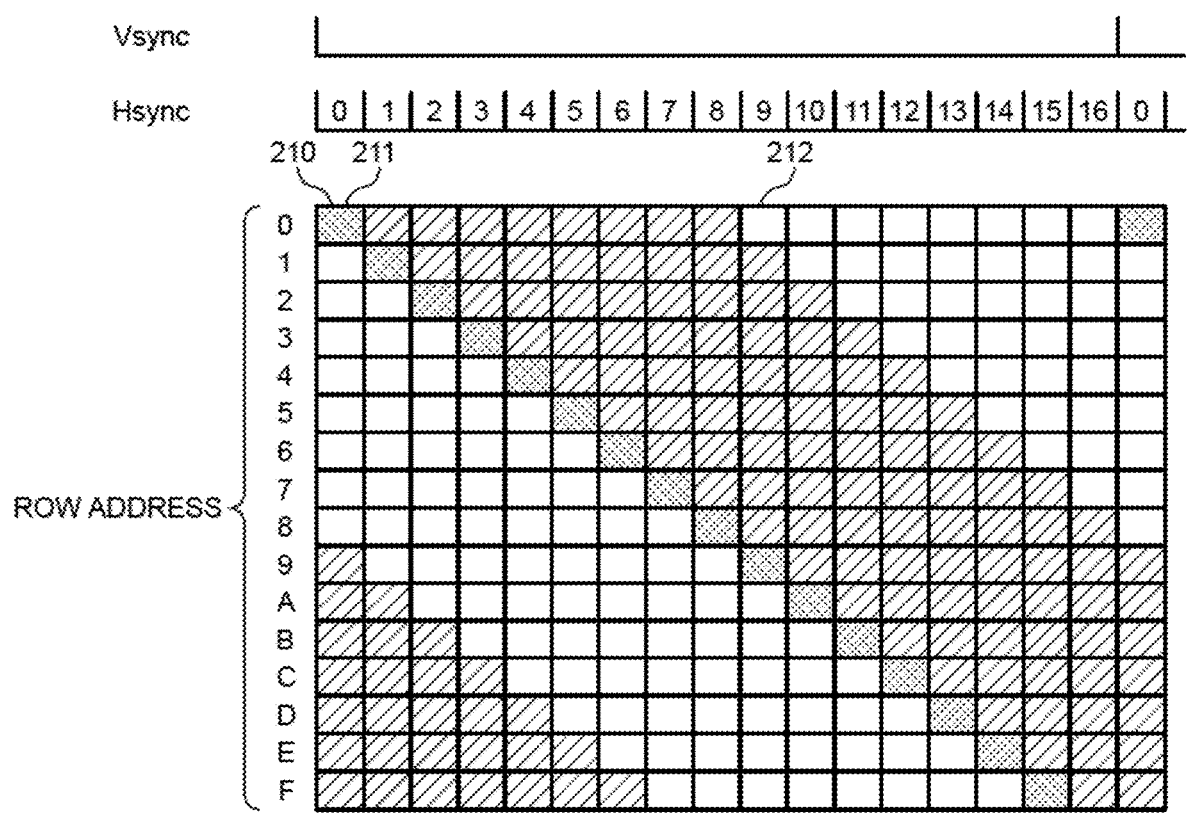
FIG. 6 is a diagram illustrating an example of light emission driving according to the first embodiment of the present disclosure.

FIG. 6 is a diagram illustrating an example of light emission driving according to the first embodiment of the present disclosure. The drawing is a timing chart illustrating an example of duty driving in the pixel array unit 20. "Vsync" in the drawing is a signal representing the vertical scanning period in the line-sequential driving. "Hsync" in the drawing is a signal representing a horizontal scanning period in the line-sequential driving. Note that the number identifies the horizontal scanning period. "ROW ADDRESS" in the drawing represents an address (hexadecimal notation) of a row of the pixel array unit 20. The row address "0" corresponds to the first row of the pixel array unit 20, and the row address "F" corresponds to the last row of the pixel array unit 20.

Rectangles in the drawing represent the states of the pixels 100 arranged in a row of the pixel array unit 20. Among them, a rectangle with dot hatching represents a row on which writing is performed. Furthermore, a hatched rectangle represents a row in a light emission state. Furthermore, an outlined rectangle represents a row in a non-light emission state.

In the horizontal scanning period 0, the write address "0" is input to the decode circuit 31, writing is performed in the row at the row address "0", and light emission is started. The erase address "8" is input to the decode circuit 31, and light emission is stopped in the row at the row address "8". The value "1" is added to the write address and the erase address every horizontal scanning period, and the write address and the erase address are input to the decode circuit 31. Therefore, light emission start 211 and light emission stop 212 are sequentially executed for each row of the pixel array unit 20 following writing 210. As a result, the duty driving can be performed in the pixel array unit 20, and afterimage feeling at the time of moving image display can be reduced.

As described above, in the display device 10 of the first embodiment of the present disclosure, a plurality of address signals are input to the decode circuit 31 at different timings in one horizontal scanning period. The decode circuit 31 selects a row corresponding to the plurality of address signals. Therefore, the circuit can be simplified as compared with a case where the decode circuit is arranged for each of the plurality of address signals.

2. SECOND EMBODIMENT

In the display device 10 of the first embodiment described above, the light emission current of the drive transistor 103 flows according to the image signal held in the holding capacitor 102 of the pixel 100. On the other hand, a display device 10 of a second embodiment of the present disclosure is different from that of the first embodiment described above in correcting variations in thresholds of drive transistors 103 of pixels 100.

[Configuration of Pixel]

Figure 7:
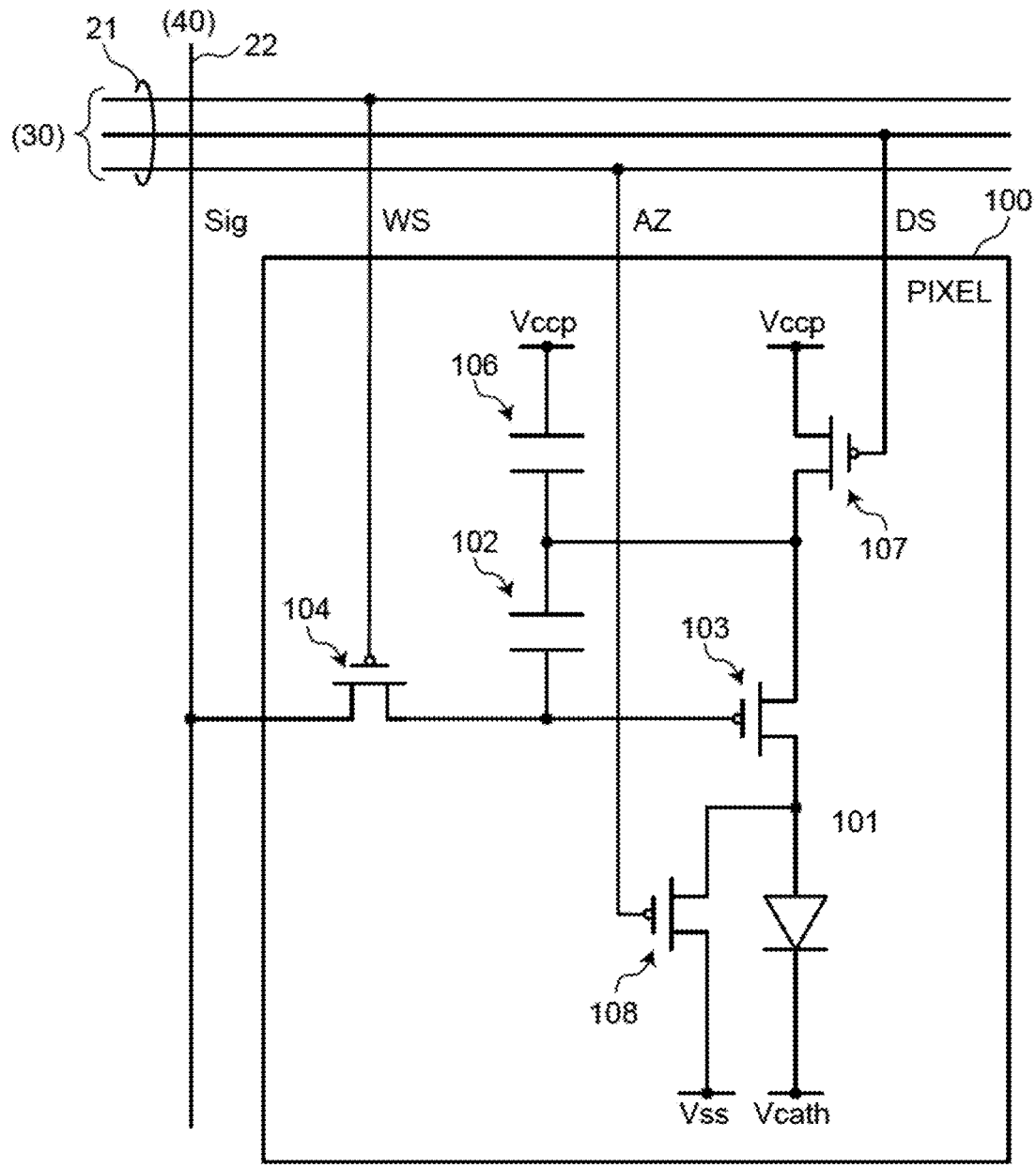
FIG. 7 is a diagram illustrating a configuration example of a pixel according to a second embodiment of the present disclosure.

FIG. 7 is a diagram illustrating a configuration example of a pixel according to the second embodiment of the present disclosure. The drawing is a circuit diagram illustrating a configuration example of the pixel 100, similarly to FIG. 2. The pixel 100 in the drawing is different from the pixel 100 in FIG. 2 in that the reset transistor 105 is omitted, and a light emission control transistor 107, a switching transistor 108, and an auxiliary capacitor 106 are further provided. Note that p-channel MOS transistors can be used as the drive transistor 103, a sampling transistor 104, the light emission control transistor 107, and the switching transistor 108 in the drawing.

A signal line AZ and a signal line DS are wired to the pixel 100 in addition to a signal line WS and a signal line Sig. Note that the signal line RESET in FIG. 2 is omitted.

A cathode of a light emitting element 101 is connected to a power supply line Vcath, and an anode is connected to a drain of the drive transistor 103 and a drain of the switching transistor 108. A source of the switching transistor 108 is connected to a power supply line Vss, and a gate is connected to the signal line AZ. A gate of the drive transistor 103 is connected to a drain of the sampling transistor 104 and one end of the holding capacitor 102. The other end of the holding capacitor 102 is connected to a source of the drive transistor 103, a drain of the light emission control transistor 107, and one end of the auxiliary capacitor 106. The other end of the auxiliary capacitor 106 is connected to a power supply line Vccp. A source of the light emission control transistor 107 is connected to the power supply line Vccp, and a gate is connected to the signal line DS. A source of the sampling transistor 104 is connected to the signal line Sig, and a gate is connected to the signal line WS.

The light emission control transistor 107 is a transistor that controls light emission and non-light emission of the light emitting element 101. The light emission control transistor 107 is controlled by a light emission control signal transmitted by the signal line DS. Note that the light emission control transistor 107 is an example of a "switch element" of the present disclosure.

The switching transistor 108 is a transistor that controls the light emitting element 101 so as not to emit light in a non-light emission period of the light emitting element 101. The switching transistor 108 is controlled by a control signal transmitted by the signal line AZ. When the switching transistor 108 is brought into a conductive state, a path bypassing the light emitting element 101 is formed, and light emission of the light emitting element 101 is stopped. Note that the switching transistor 108 is an example of a "second switch element" of the present disclosure.

The auxiliary capacitor 106 is a capacitor that suppresses fluctuation of a source voltage of the drive transistor 103 when the image signal voltage Vsig is written. Furthermore, the auxiliary capacitor 106 has an action of setting a gate-source voltage Vgs of the drive transistor 103 to a threshold voltage Vth of the drive transistor 103.

In the p-channel MOS transistor such as the drive transistor 103 in the drawing, an on-voltage applied to the gate is a low voltage with respect to the source.

[Driving Method]

Figure 8:
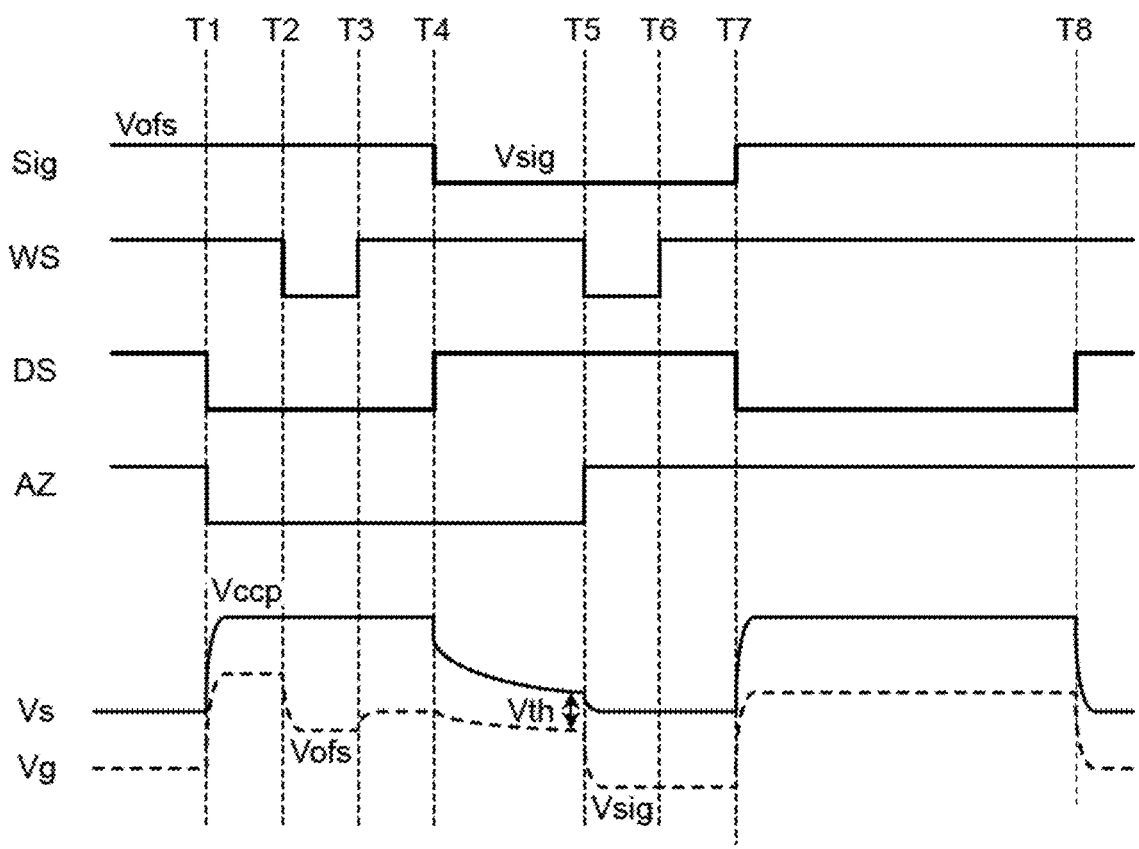
FIG. 8 is a diagram illustrating an example of a pixel driving method according to the second embodiment of the present disclosure.

FIG. 8 is a diagram illustrating an example of a pixel driving method according to the second embodiment of the present disclosure. The drawing is a timing chart illustrating an example of a driving method of the light emitting element 101 in the pixel 100. "Sig" in the drawing represents the image signal voltage Vsig and a reference voltage Vofs transmitted by the signal line Sig. "Vsig" and "Vofs" in the drawing represent portions to which the image signal voltage Vsig and the reference voltage Vofs are applied. Furthermore, "WS", "DS", and "AZ" in the drawing represent the control signals transmitted by the signal line WS, the signal line DS, and the signal line AZ, and a portion of the value "0" of the binarized control signals represents the on-voltage described above. On the other hand, a portion of the value "1" represents an off-voltage. "Vs" and "Vg" in the drawing represent the source voltage and a gate voltage of the drive transistor 103.

In an initial state, the reference voltage Vofs is applied to the signal line Sig. The off-voltage is applied to the signal line DS, the signal line WS, and the signal line AZ.

At T1, the on-voltage is applied to the signal line DS, and the light emission control transistor 107 is brought into the conductive state. Furthermore, the on-voltage is applied to the signal line AZ, and the switching transistor 108 is brought into the conductive state. As a result, the current flowing through the drive transistor 103 flows into the power supply line Vss via the switching transistor 108.

At T2, the on-voltage is applied to the signal line WS, and the sampling transistor 104 is brought into the conductive state. At this time, since the light emission control transistor 107 is in the conductive state, the power supply voltage Vccp is applied to a source node of the drive transistor 103. The reference voltage Vofs is written into a gate node of the drive transistor 103 via the sampling transistor 104.

At T3, the application of the on-voltage to the signal line WS is stopped, and the sampling transistor 104 is brought into the non-conductive state. As a result, the writing of the reference voltage Vofs ends. Note that a current flows through the drive transistor 103 by the writing of the reference voltage Vofs. This current flows into the power supply line Vss via the switching transistor 108. Therefore, the light emitting element 101 does not emit light.

At T4, the application of the on-voltage to the signal line DS is stopped, and the light emission control transistor Tr3 is brought into the non-conductive state. As a result, the source node of the drive transistor 103 is brought into a floating state. That is, after the reference voltage Vofs is written into the gate node of the drive transistor 103, the gate node and then the source node of the drive transistor 103 are brought into the floating state in this order. Furthermore, the image signal voltage Vsig is applied to the signal line Sig.

Then, when both the gate node and the source node of the drive transistor 103 are brought into the floating state, a self-discharge operation is performed. The discharge of the potential of each node in the self-discharge operation is performed through the paths of the drive transistor 103, the switching transistor 108, and the power supply line Vss. Then, both the source voltage Vs and the gate voltage Vg of the drive transistor 103 gradually decrease by the self-discharge operation. When the gate-source voltage Vgs reaches the threshold voltage Vth, the drive transistor 103 becomes non-conductive, and the self-discharge operation is stopped.

At T5, the on-voltage is applied to the signal line WS, and the sampling transistor 104 is brought into the conductive state. As a result, the signal voltage Vsig is written by sampling by the sampling transistor 104 while the source node of the drive transistor 103 is in the floating state. A voltage held in the holding capacitor 102 is Vth+Vsig. Furthermore, the application of the on-voltage of the signal line AZ is stopped, and the switching transistor 108 is brought into the non-conductive state.

At T6, the application of the on-voltage of the signal line WS is stopped, and the sampling transistor 104 is brought into the non-conductive state.

At T7, the on-voltage is applied to the signal line DS, and the light emission control transistor 107 is brought into the conductive state. As a result, an electric charge of the auxiliary capacitor 106 is discharged, and the power supply voltage Vccp is applied to the source of the drive transistor 103. The drive transistor 103 is conducted according to the voltage held in the holding capacitor 102, and the light emission current is supplied to the light emitting element 101. As a result, light emission of the light emitting element 101 is started. Furthermore, the application of the image signal voltage Vsig to the signal line Sig is stopped.

At T8, the application of the on-voltage to the signal line DS is stopped, and the drive transistor 103 is brought into the non-conductive state. As a result, the supply of the light emission current to the light emitting element 101 is stopped, and the light emission of the light emitting element 101 is stopped. Through the above operation, writing into the pixel 100, light emission start, and light emission stop can be performed.

[Configuration of Vertical Drive Unit]

Figure 9:
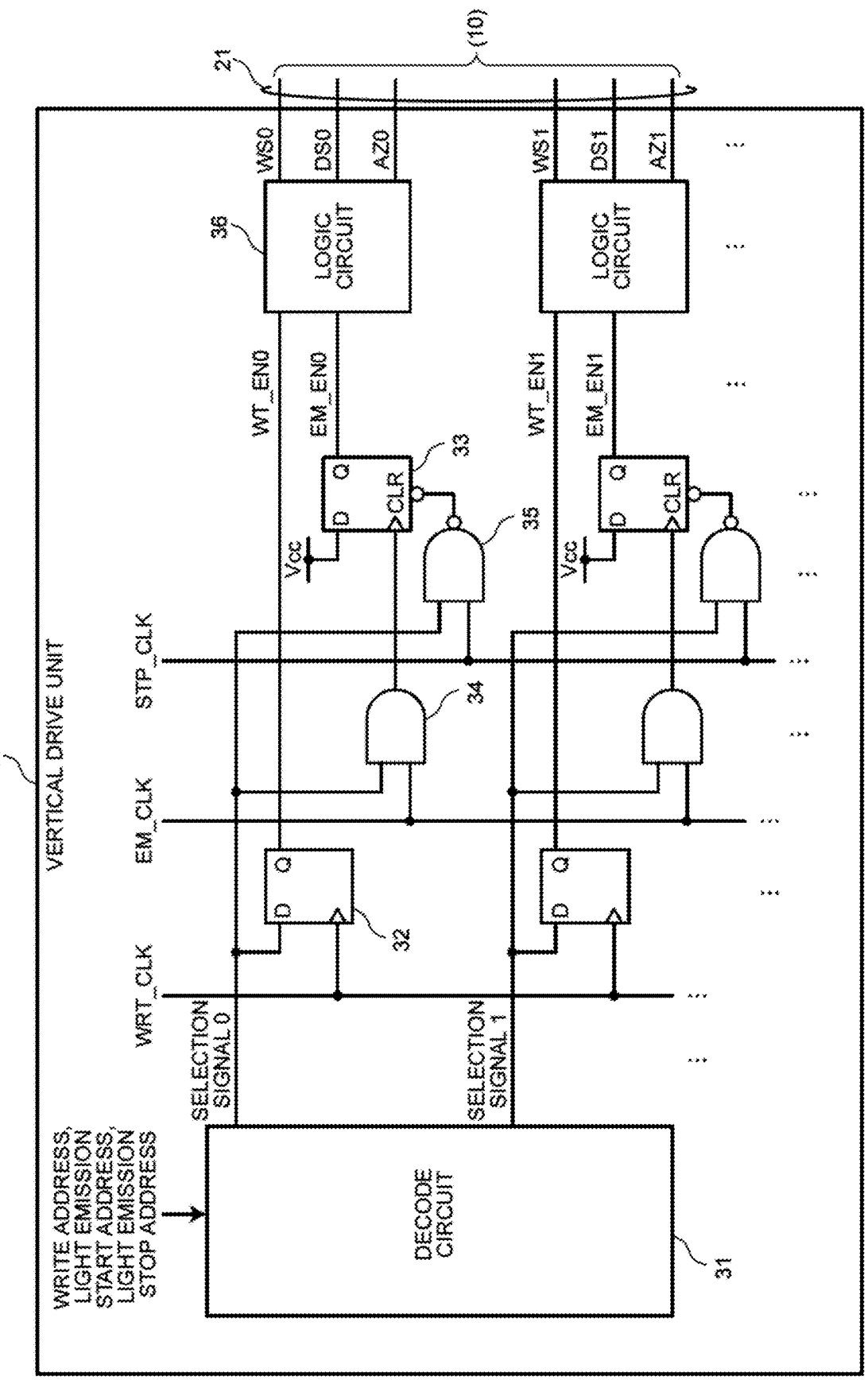
FIG. 9 is a diagram illustrating a configuration example of a vertical drive unit according to the second embodiment of the present disclosure.

FIG. 9 is a diagram illustrating a configuration example of a vertical drive unit according to the second embodiment of the present disclosure. The drawing is a block diagram illustrating a configuration example of a vertical drive unit 30, similarly to FIG. 3. The vertical drive unit 30 in the drawing is different from the vertical drive unit 30 in FIG. 3 in that an AND gate 34, a NAND gate 35, and a logic circuit 36 are further provided, and a signal line EM_CLK and a signal line STP_CLK are arranged instead of the signal line RES_CLK. Furthermore, a light emission start address signal and a light emission stop address signal are input, in addition to a write address signal, to a decode circuit 31 in the drawing. The light emission start address signal is a signal representing a row of a pixel array unit 20 on which control to start the supply of the light emission current to the light emitting element 101 is performed. The light emission stop address signal is a signal representing a row of the pixel array unit 20 on which control to stop the supply of the light emission current to the light emitting element 101 is performed. Note that the number added to the "SELECTION SIGNAL" or the like represents the corresponding row of the pixel array unit 20.

A Q output of a latch circuit 32 in the drawing outputs a WT_EN signal, which is a write selection signal. This signal is input to the logic circuit 36. The selection signal and EM_CLK, which is a clock signal transmitted by the signal line EM_CLK, are input to an input of the AND gate 34. An output of the AND gate 34 is connected to a clock terminal of a latch circuit 33. The selection signal and STP_CLK, which is a clock signal transmitted by the signal line STP_CLK, are input to an input of the NAND gate 35. An output of the NAND gate 35 is connected to a clear terminal of the latch circuit 33. Furthermore, a power supply voltage is applied to a D input terminal of the latch circuit 33. The latch circuit 33 generates a signal having a pulse width from the rise of EM_CLK to the rise of STP_CLK. The Q output of the latch circuit 33 outputs an EM_EN signal, which is a light emission control selection signal. This signal is input to the logic circuit 36.

The logic circuit 36 is a circuit that generates a drive signal of the pixel 100. The logic circuit 36 generates control signals to be applied to the signal line WS, the signal line DS, and the signal line AZ described in FIG. 7 based on the input WT_EN signal and EM_EN signal. The logic circuit 36 can be configured by, for example, a circuit in which logic gates are combined. Specifically, the logic circuit can be configured by a combination logic circuit that receives the WT_EN signal, the EM_EN signal, and a signal toggling in one horizontal period and is based on a truth table for generating control signals of the signal line WS, the signal line DS, and the signal line AZ.

[Driving Method]

Figure 10:
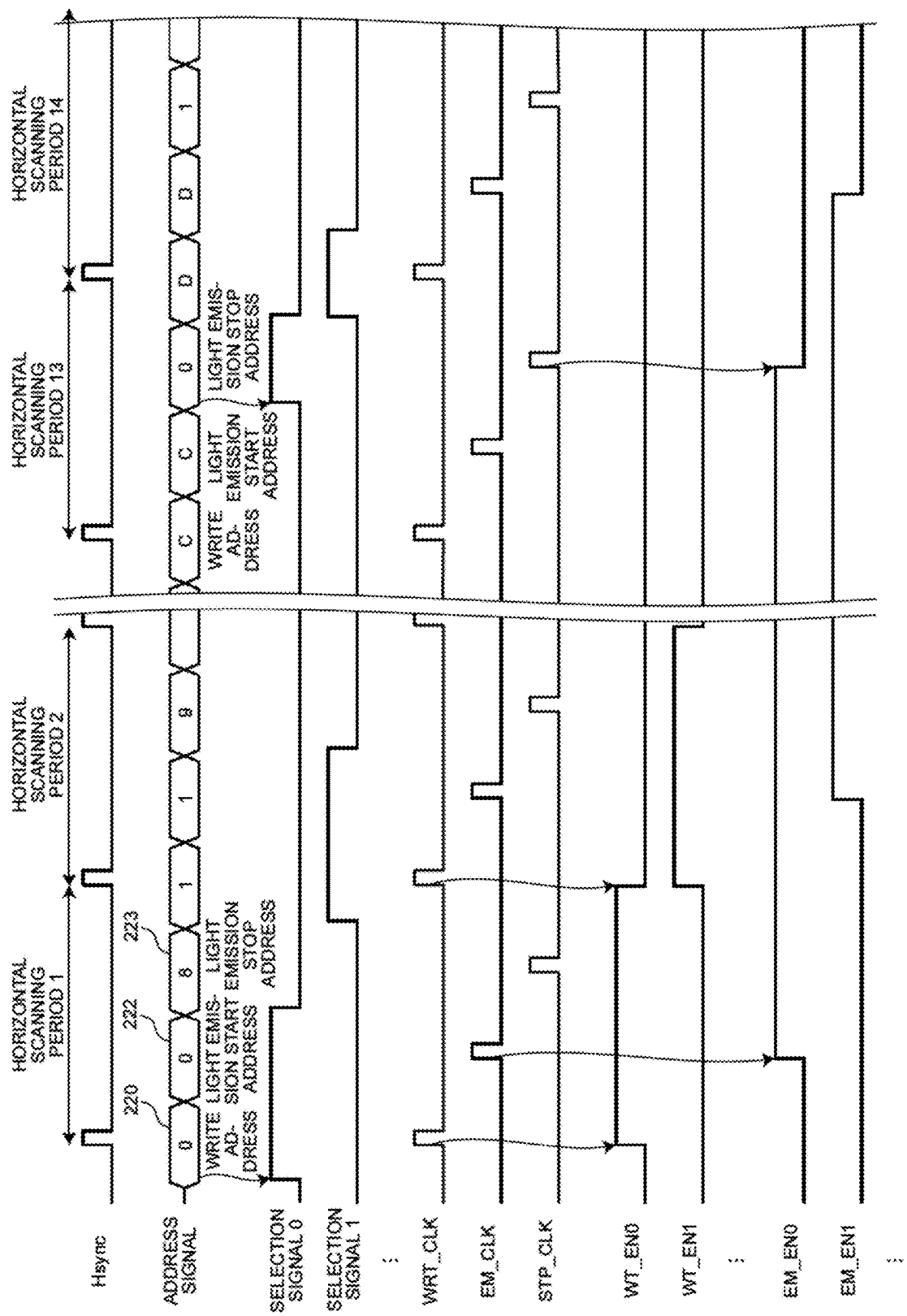
FIG. 10 is a diagram illustrating an example of a driving method according to the second embodiment of the present disclosure.

FIG. 10 is a diagram illustrating an example of a driving method according to the second embodiment of the present disclosure. The drawing is a timing chart illustrating an example of a driving method of the light emitting element 101 in the pixel 100, similarly to FIG. 5. "EM_CLK" and "STP_CLK" represent the clock signals described in FIG. 9. "WT_EN" and "EM_EN" represent the WT_EN signal and the EM_EN signal described in FIG. 9. Other than this, the same notation as in FIG. 5 is used.

As illustrated in the drawing, a write address 220, a light emission start address 222, and a light emission stop address 223 are input to the decode circuit 31 every horizontal scanning period. The row of the pixel array unit 20 corresponding to these addresses is selected, and the selection signals are output. The selection signal selected by the write address is held in the latch circuit 32 at the rise of WRT_CLK and output as the WT_EN signal. Furthermore, the selection signal selected by the light emission start address is held in the latch circuit 33 at the rise of EM_CLK, and the EM_EN signal transitions to "1". Furthermore, the output of the latch circuit 33 is cleared by the selection signal selected by the light emission stop address and a signal of the logical product of STP_CLK, and the EM_EN signal transitions to "0". Note that the drawing illustrates an example of a case where the write address and the light emission start address are equal.

Also in the drawing, the selection signal selected by the write address corresponds to a write selection signal representing a row of the pixel array unit 20 on which writing is performed. Furthermore, the selection signal selected by the light emission start address and the selection signal selected by the light emission stop address correspond to a light emission control selection signal representing a row on which control of the light emission current is performed. Among them, the selection signal selected by the light emission start address corresponds to a light emission start control selection signal, and the selection signal selected by the light emission stop address corresponds to a light emission stop control selection signal.

As described above, the write address signal, the light emission start address signal, and the light emission stop address signal are input to the decode circuit 31 in one horizontal scanning period, and the selection signals of the corresponding row are output. Among these selection signals, the selection signal based on the write address signal and the selection signal based on the light emission stop address signal are taken into and held in the latch circuits 32 and 33 at different timings by WRT_CLK and EM_CLK, which are clock signals. Furthermore, the signal held in the latch circuit 33 is cleared in synchronization with the selection signal based on the light emission stop address signal and the signal based on STP_CLK, which is a clock signal.

[Drive Signal]

Figure 11:
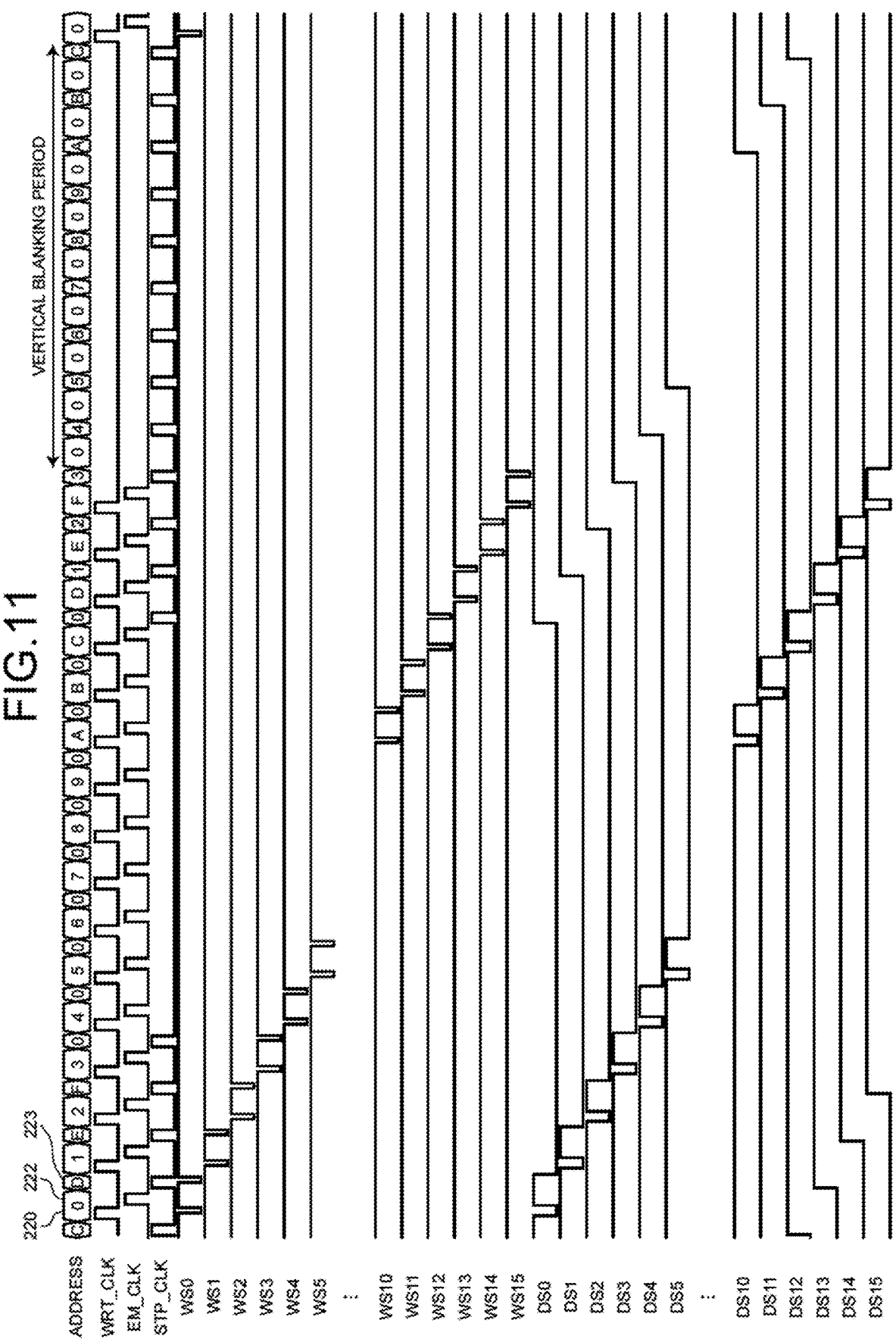
FIG. 11 is a diagram illustrating an example of a drive signal according to the second embodiment of the present disclosure.

FIG. 11 is a diagram illustrating an example of a drive signal according to the second embodiment of the present disclosure. The drawing is a timing chart illustrating an example of a drive signal generated by the logic circuit 36. "ADDRESS SIGNAL" in the drawing represents an address signal input to the decode circuit 31. "WRT_CLK", "EM_CLK", and "STP_CLK" represent clock signals. "WS" and "DS" represent control signals generated by the logic circuit 36 and output to the signal line WS and the signal line DS.

As illustrated in the drawing, the signal having the waveform described in FIG. 8 is generated and sequentially output to the signal line WS and the signal line DS of the row corresponding to the address signal. Note that the drawing illustrates the drive signal in a case where the number of horizontal scanning periods is larger than the number of rows of the pixel array unit 20. A blanking period (vertical blanking period) is arranged after write driving is completed for all the rows. The vertical blanking period is a period in which writing and light emission start are not controlled. In the example of the drawing, the supply of WRT_CLK and EM_CLK is stopped in the vertical blanking period, and the selection of a row is stopped. Also in STP_CLK, the supply of the clock signal can be stopped to stop the selection of an unnecessary row. Note that it is also possible to adopt a method of stopping selection of a row by outputting an address signal not corresponding to the row of the pixel array unit 20 in the vertical blanking period.

[Light Emission Driving]

Figure 12:
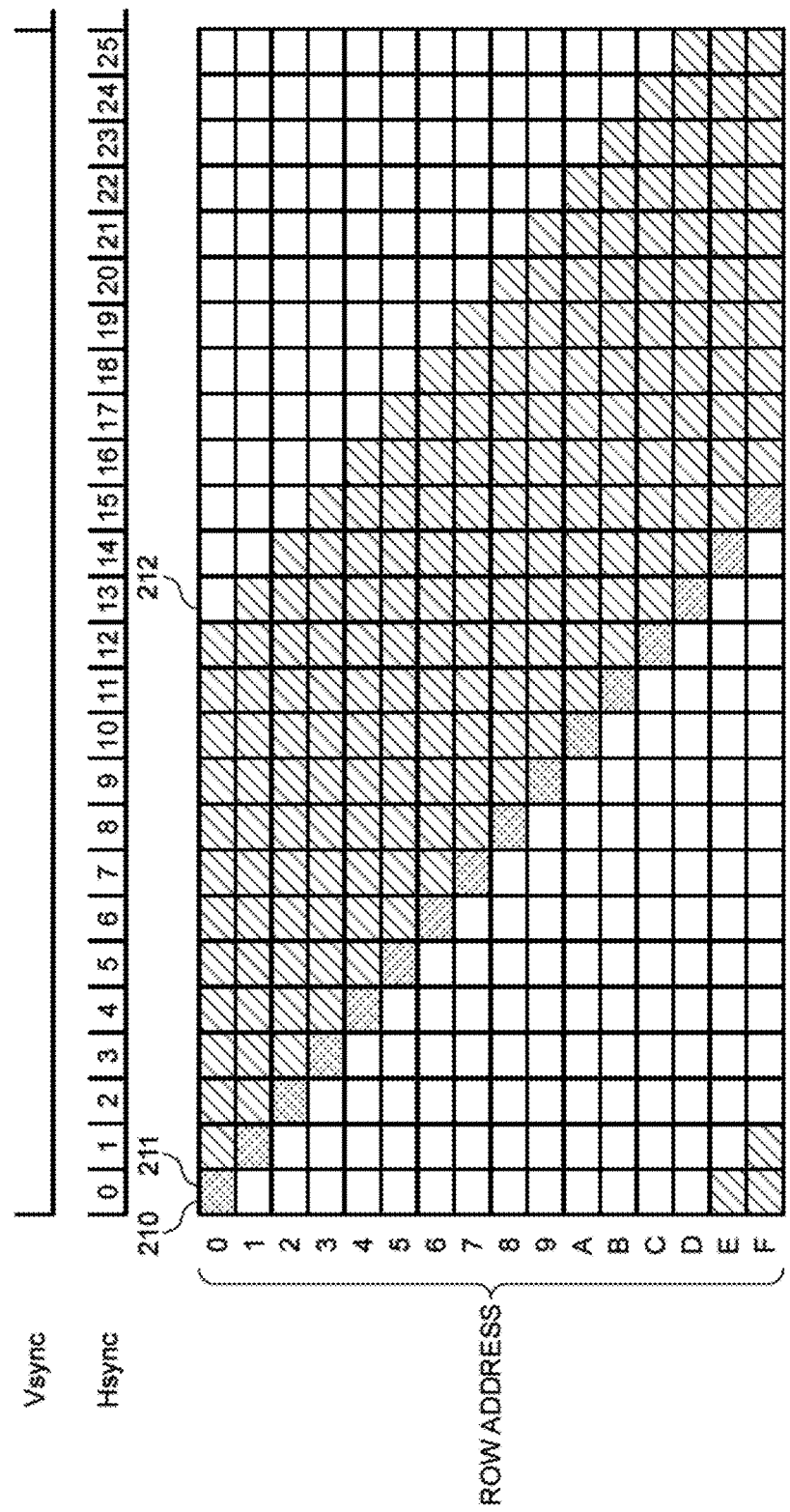
FIG. 12 is a diagram illustrating an example of light emission driving according to the second embodiment of the present disclosure.

FIG. 12 is a diagram illustrating an example of light emission driving according to the second embodiment of the present disclosure. The drawing is a timing chart illustrating an example of duty driving in the pixel array unit 20, similarly to FIG. 6, and is a diagram illustrating a state of light emission driving by the drive signal in FIG. 11. In the drawing, the same notation as in FIG. 6 is used. Furthermore, the drawing illustrates an example of a case where the number of horizontal scanning periods is 26 while the number of rows of the pixel array unit 20 is 16. A period from a "horizontal scanning period 16" to a "horizontal scanning period 25" corresponds to the vertical blanking period described above. Duty driving can be performed in the pixel array unit 20.

The configuration of the display device 10 other than this is similar to the configuration of the display device 10 in the first embodiment of the present disclosure, and thus the description will be omitted.

As described above, in the display device 10 of the second embodiment of the present disclosure, the address signals for writing, light emission start, and light emission stop are input to the decode circuit 31 in one horizontal scanning period. As a result, the circuit of the vertical drive unit 30 can be simplified even when the threshold of the drive transistor 103 is corrected.

3. THIRD EMBODIMENT

The display device 10 of the second embodiment described above performs writing and the like for each row of the pixel array unit 20. On the other hand, a display device 10 of a third embodiment of the present disclosure is different from that of the second embodiment described above in that writing and the like are simultaneously performed on two rows of a pixel array unit 20.

[Light Emission Driving]

Figure 13:
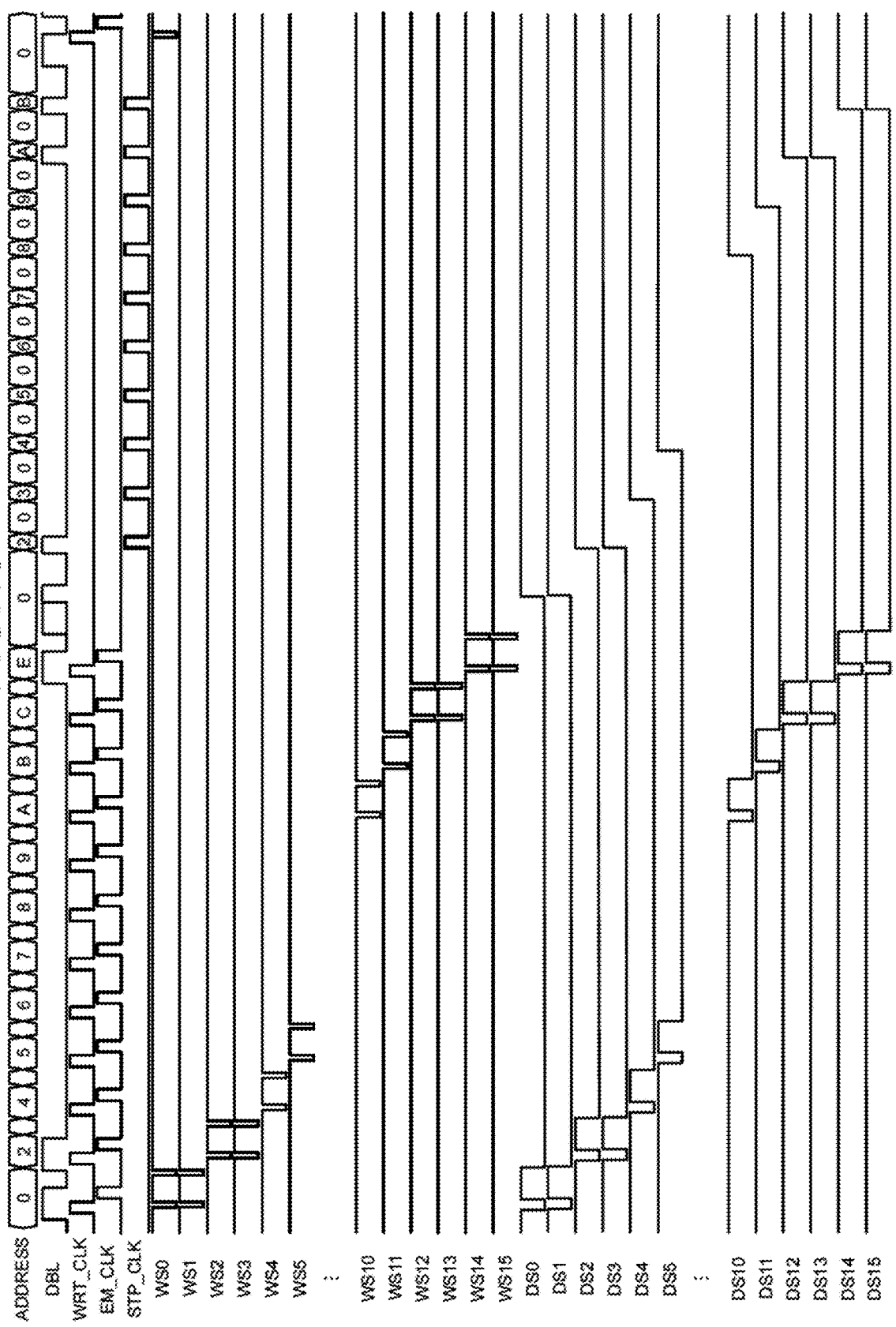
FIG. 13 is a diagram illustrating an example of a drive signal according to a third embodiment of the present disclosure.

FIG. 13 is a diagram illustrating an example of a drive signal according to the third embodiment of the present disclosure. The drawing is a timing chart illustrating an example of a drive signal generated by a logic circuit 36, similarly to FIG. 11. In the drawing, a control signal "DBL" is further described. The DBL signal is a control signal for selecting two adjacent rows by an address signal. When the DBL signal is "1", two rows are selected.

In the drawing, when an address "0" is input, the DBL signal becomes "1". As a result, row addresses "0" and "1" are simultaneously selected in a vertical drive unit 30. The vertical drive unit 30 simultaneously performs driving for writing, light emission start, and light emission stop on pixels 100 in the selected two rows. Writing and the like are simultaneously performed at row addresses "2" and "3", row addresses "12" and "13", and row addresses "14" and "15". Such driving is referred to as bundle driving or doubler driving. By performing the bundle driving on the rows at the upper and lower end portions of the pixel array unit 20, the resolution of the region is reduced to ½.

On the other hand, in the row at the central portion of the pixel array unit 20, writing and the like are performed for each row. As described above, by making the resolution at the central portion of the pixel array unit 20 higher than the resolution at the upper and lower end portions, it is possible to perform the Foveated driving for increasing the resolution around the viewpoint of a user.

The configuration of the display device 10 other than this is similar to the configuration of the display device 10 in the second embodiment of the present disclosure, and thus the description will be omitted.

As described above, the display device 10 of the third embodiment of the present disclosure can perform the bundle driving by simultaneously selecting two adjacent rows of the pixel array unit 20 based on the address signal input in the horizontal scanning period.

4. FOURTH EMBODIMENT

The display device 10 of the second embodiment described above performs duty driving by inputting the light emission start address signal and the light emission stop address signal to the decode circuit 31 in the horizontal scanning period. On the other hand, a display device 10 of a fourth embodiment of the present disclosure is different from that of the second embodiment described above in that a plurality of light emission start address signals and light emission stop address signals are input to a decode circuit 31 in a horizontal scanning period.

[Driving Method]

Figure 14:
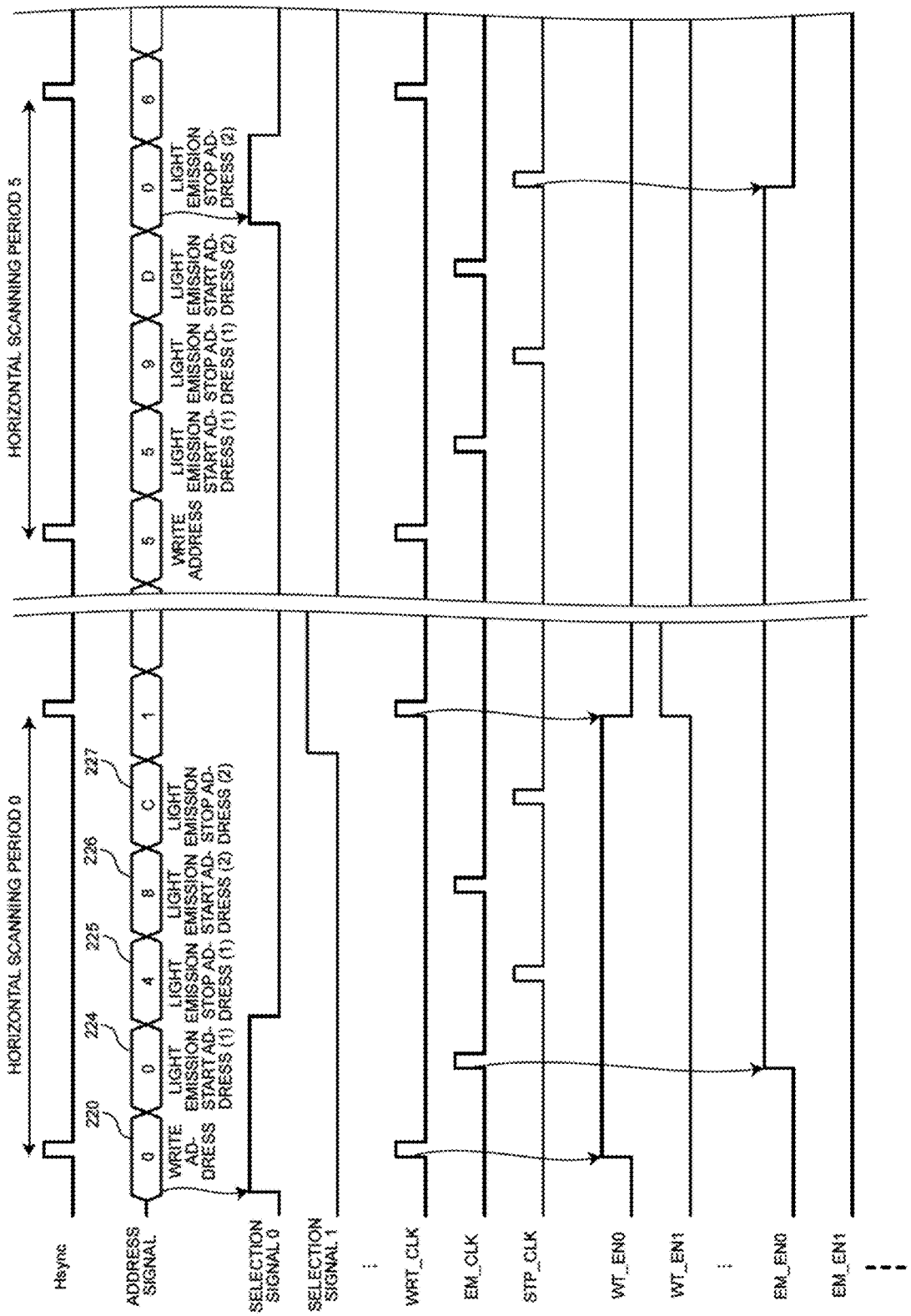
FIG. 14 is a diagram illustrating an example of a driving method according to a fourth embodiment of the present disclosure.

FIG. 14 is a diagram illustrating an example of a driving method according to the fourth embodiment of the present disclosure. The drawing is a timing chart illustrating an example of a driving method of a light emitting element 101 in a pixel 100, similarly to FIG. 10. The drawing uses the same notation as in FIG. 5.

As illustrated in the drawing, a light emission start address (1) 224, a light emission stop address (1) 225, a light emission start address (2) 226, and a light emission stop address (2) 227 are input, in addition to a write address 220, to the decode circuit 31 every horizontal scanning period. That is, a vertical drive unit 30 of the fourth embodiment of the present disclosure controls light emission start and light emission stop twice in the horizontal scanning period. In the drawing, EM_CLK has clock pulses respectively corresponding to the light emission start address (1) and the light emission start address (2), and STP_CLK has clock pulses respectively corresponding to the light emission stop address (1) and the light emission stop address (2).

An EM_EN signal having two periods of a value "1" in the vertical scanning period is generated based on the light emission start address (1), the light emission stop address (1), the light emission start address (2), and the light emission stop address (2). By applying a control signal based on the EM_EN signal, it is possible to perform driving having two light emission periods in the vertical scanning period.

[Light Emission Driving]

Figure 15:
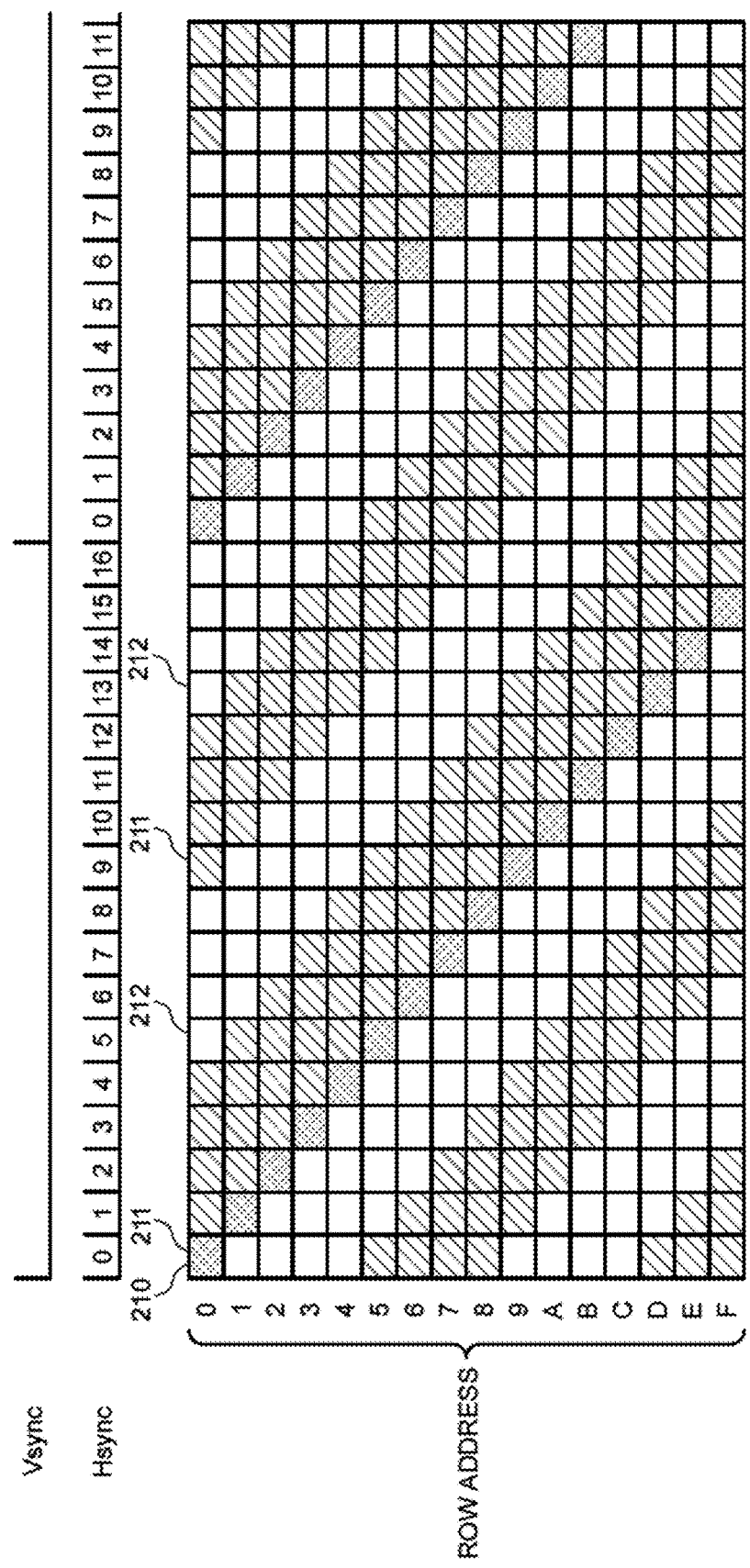
FIG. 15 is a diagram illustrating an example of light emission driving according to the fourth embodiment of the present disclosure.

FIG. 15 is a diagram illustrating an example of light emission driving according to the fourth embodiment of the present disclosure. The drawing is a timing chart illustrating an example of duty driving in the pixel array unit 20, similarly to FIG. 12, and is a diagram illustrating a state of light emission driving by the drive signal in FIG. 14. In the drawing, the same notation as in FIG. 6 is used. In each row of the pixel array unit 20, light emission start 211 and light emission stop 212 are executed twice in the vertical scanning period. Such a driving method is referred to as divided light emission.

Note that the light emission driving according to the fourth embodiment of the present disclosure is not limited to this example. For example, in each row of the pixel array unit 20, light emission start and light emission stop can be executed three or more times in the vertical scanning period.

The configuration of the display device 10 other than this is similar to the configuration of the display device 10 in the second embodiment of the present disclosure, and thus the description will be omitted.

As described above, in the display device 10 of the fourth embodiment of the present disclosure, two light emission start address signals and two light emission stop address signals are input, in addition to the write address signal, to the decode circuit 31 in one horizontal scanning period. As a result, divided light emission can be performed.

5. FIFTH EMBODIMENT

The display device 10 of the second embodiment described above is driven with the light emission start and light emission stop timings shifted for each row of the pixel array unit 20. On the other hand, a display device 10 of a fifth embodiment of the present disclosure is different from that of the second embodiment described above in that light emission start and light emission stop are collectively controlled in all rows.

[Configuration of Vertical Drive Unit]

Figure 16:
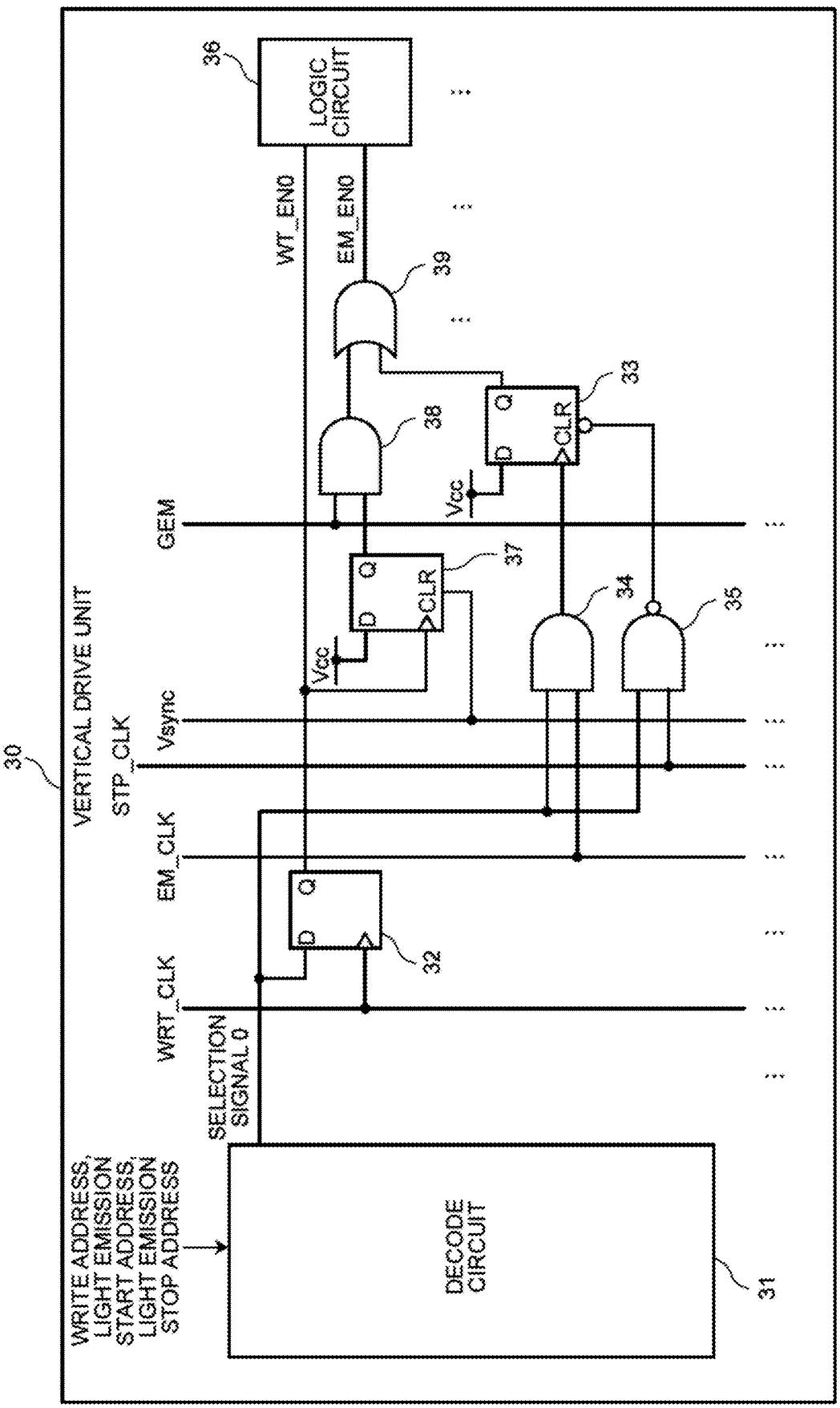
FIG. 16 is a diagram illustrating a configuration example of a vertical drive unit according to a fifth embodiment of the present disclosure.

FIG. 16 is a diagram illustrating a configuration example of a vertical drive unit according to the fifth embodiment of the present disclosure. The drawing is a block diagram illustrating a configuration example of a vertical drive unit 30, similarly to FIG. 9. The vertical drive unit 30 in the drawing is different from the vertical drive unit 30 in FIG. 9 in that an AND gate 38, an OR gate 39, and a latch circuit 37 are further provided, and a signal line Vsync and a signal line GEM are arranged. The signal line Vsync is a signal line that transmits a vertical synchronization signal. The signal line GEM is a signal line that transmits a GEM signal for controlling collective light emission.

A power supply voltage is applied to a D input terminal of the latch circuit 37. A WT_EN signal is input to a clock terminal of the latch circuit 37. The signal line Vsync is connected to a clear terminal of the latch circuit 37, and the vertical synchronization signal is input thereto. Note that the clear terminal of the latch circuit 37 operates with positive logic. A Q output of the latch circuit 37 and the signal line GEM are connected to an input of the AND gate 38. An output of the AND gate 38 and a Q output of a latch circuit 33 are connected to an input of the OR gate 39. The OR gate 39 outputs an EM_EN signal. Connections other than this are similar to those of the vertical drive unit 30 in FIG. 9, and thus the description will be omitted.

When the GEM signal is input, the EM_EN signal transitions to "1" by the action of the OR gate 39. Since the GEM signal is commonly input to all rows, light emission can be collectively controlled for all rows of the pixel array unit 20.

[Light Emission Driving]

Figure 17:
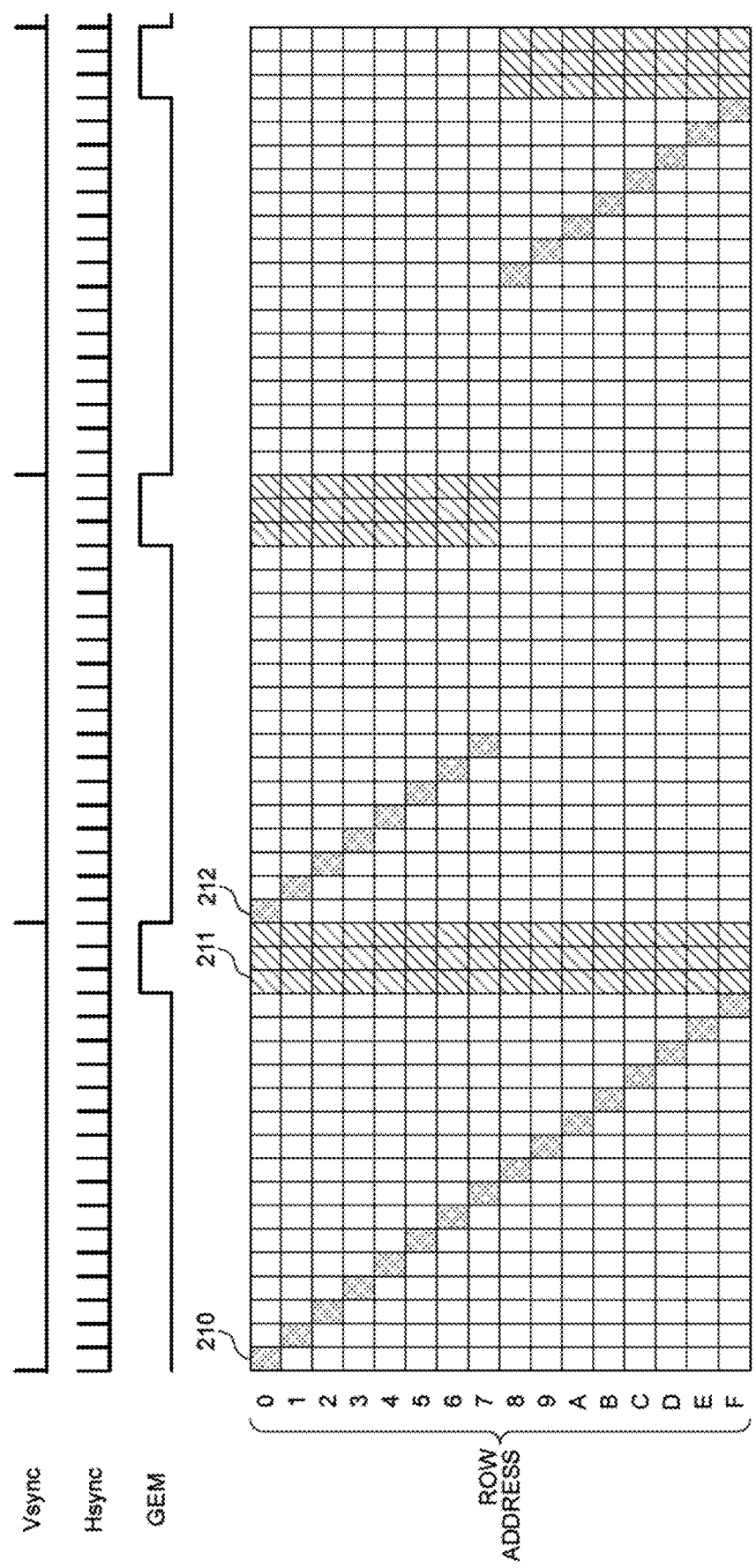
FIG. 17 is a diagram illustrating an example of light emission driving according to the fifth embodiment of the present disclosure.

FIG. 17 is a diagram illustrating an example of light emission driving according to the fifth embodiment of the present disclosure. The drawing is a timing chart illustrating an example of driving in the pixel array unit 20, similarly to FIG. 12, and is a diagram illustrating a state of light emission driving by the drive signal in FIG. 16. In the drawing, "GEM" represents the GEM signal.

As illustrated in the drawing, writing 210 is sequentially performed on the rows of the pixel array unit 20. Thereafter, in a period in which the GEM signal is "1", all the rows of the pixel array unit 20 are collectively brought into the light emission state. Note that the light emission driving in the two vertical scanning periods in the subsequent stage of the drawing illustrates an example in which the light emission driving is performed on the row on which the writing 210 has been performed. This can be performed, for example, by using the vertical drive unit 30 having a function of latching a write flag.

The configuration of the display device 10 other than this is similar to the configuration of the display device 10 in the second embodiment of the present disclosure, and thus the description will be omitted.

As described above, the display device 10 of the fifth embodiment of the present disclosure can perform light emission driving collectively on all the rows of the pixel array unit 20.

6. MODIFICATIONS

Modifications of the pixel circuit will be described.

[First Modification]

Figure 18:
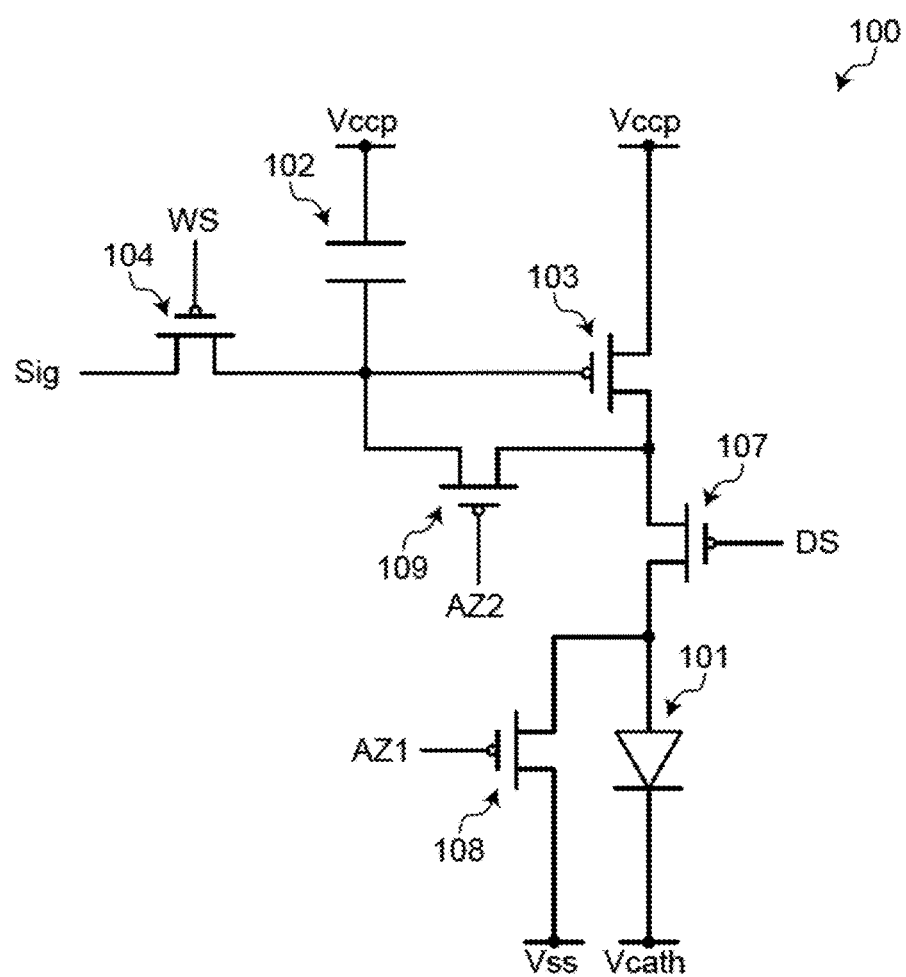
FIG. 18 is a diagram illustrating a configuration example of a pixel according to a first modification of the embodiment of the present disclosure.

FIG. 18 is a diagram illustrating a configuration example of a pixel according to a first modification of the embodiment of the present disclosure. The drawing is a circuit diagram illustrating a configuration example of the pixel 100, similarly to FIG. 7. The pixel 100 in the drawing is different from the pixel 100 in FIG. 2 in that the auxiliary capacitor 106 is omitted and a switching transistor 109 is further provided.

The switching transistor 109 is a transistor that short-circuits between the gate and the drain of the drive transistor 103. A p-channel MOS transistor can be used as the switching transistor 109. A signal line AZ2 is connected to a gate of the switching transistor 109.

Furthermore, the light emission control transistor 107 in the drawing is connected between the drain of the drive transistor 103 and the anode of the light emitting element 101. Furthermore, a signal line AZ1 is connected to a gate of the switching transistor 108 in the drawing.

In the pixel circuit of the drawing, when light emission control similar to that of the pixel circuit in FIG. 2 is performed, the light emission control transistor 107 is brought into the non-conductive state and the switching transistor 109 is made conductive. As a result, the holding capacitor 102 is discharged, the drive transistor 103 can be brought into the non-conductive state, and the supply of the light emission current to the light emitting element 101 can be stopped.

Furthermore, in the pixel circuit of the drawing, when light emission control similar to that of the pixel circuit in FIG. 7 is performed, conduction and non-conduction of the light emission control transistor 107 are controlled. As a result, control to start and stop the supply of the light emission current of the light emitting element 101 can be performed.

[Second Modification]

Figure 19:
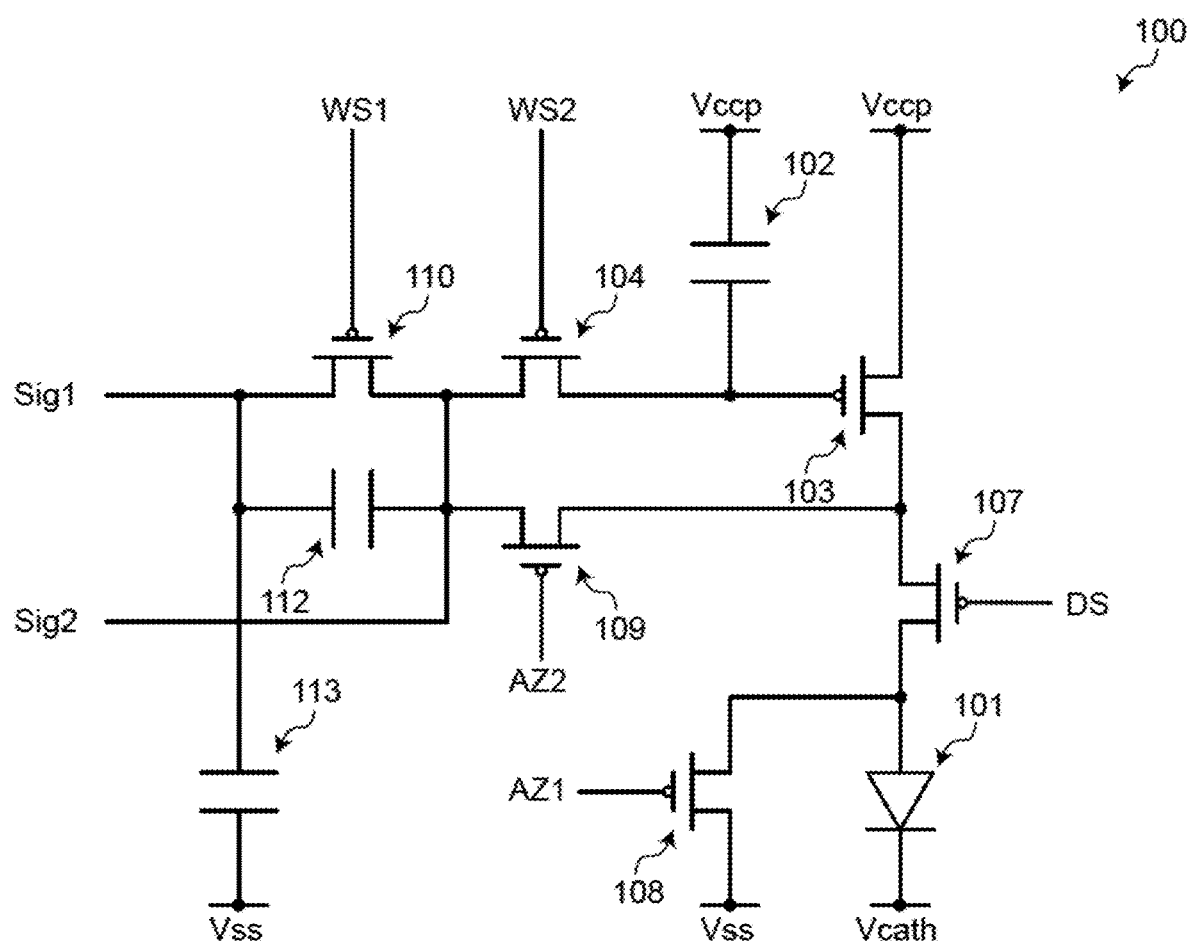
FIG. 19 is a diagram illustrating a configuration example of a pixel according to a second modification of the embodiment of the present disclosure.

FIG. 19 is a diagram illustrating a configuration example of a pixel according to a second modification of the embodiment of the present disclosure. The drawing is a circuit diagram illustrating a configuration example of the pixel 100, similarly to FIG. 18. The pixel 100 in the drawing is different from the pixel 100 in FIG. 18 in further including a sampling transistor 110 and capacitors 112 and 113.

A source of the sampling transistor 110 is connected to the drain of the sampling transistor 104, and a drain is connected to a signal line Sig1. A signal line WS1 is connected to a gate of the sampling transistor 110. The capacitor 112 is connected between a drain and a source of the sampling transistor 110. The capacitor 113 is connected between the drain of the sampling transistor 110 and the power supply line Vss. Furthermore, a signal line Sig2 is connected to the drain of the sampling transistor 104. Furthermore, a signal line WS2 is connected to a gate of the sampling transistor 104.

In the pixel circuit of the drawing, when light emission control similar to that of the pixel circuit in FIG. 2 is performed, the light emission control transistor 107 is brought into the non-conductive state, and the switching transistor 109 and the sampling transistor 104 are made conductive. As a result, the holding capacitor 102 is discharged, the drive transistor 103 can be brought into the non-conductive state, and the supply of the light emission current to the light emitting element 101 can be stopped.

Furthermore, in the pixel circuit of the drawing, when light emission control similar to that of the pixel circuit in FIG. 7 is performed, conduction and non-conduction of the light emission control transistor 107 are controlled. As a result, control to start and stop the supply of the light emission current of the light emitting element 101 can be performed.

[Third Modification]

Figure 20:
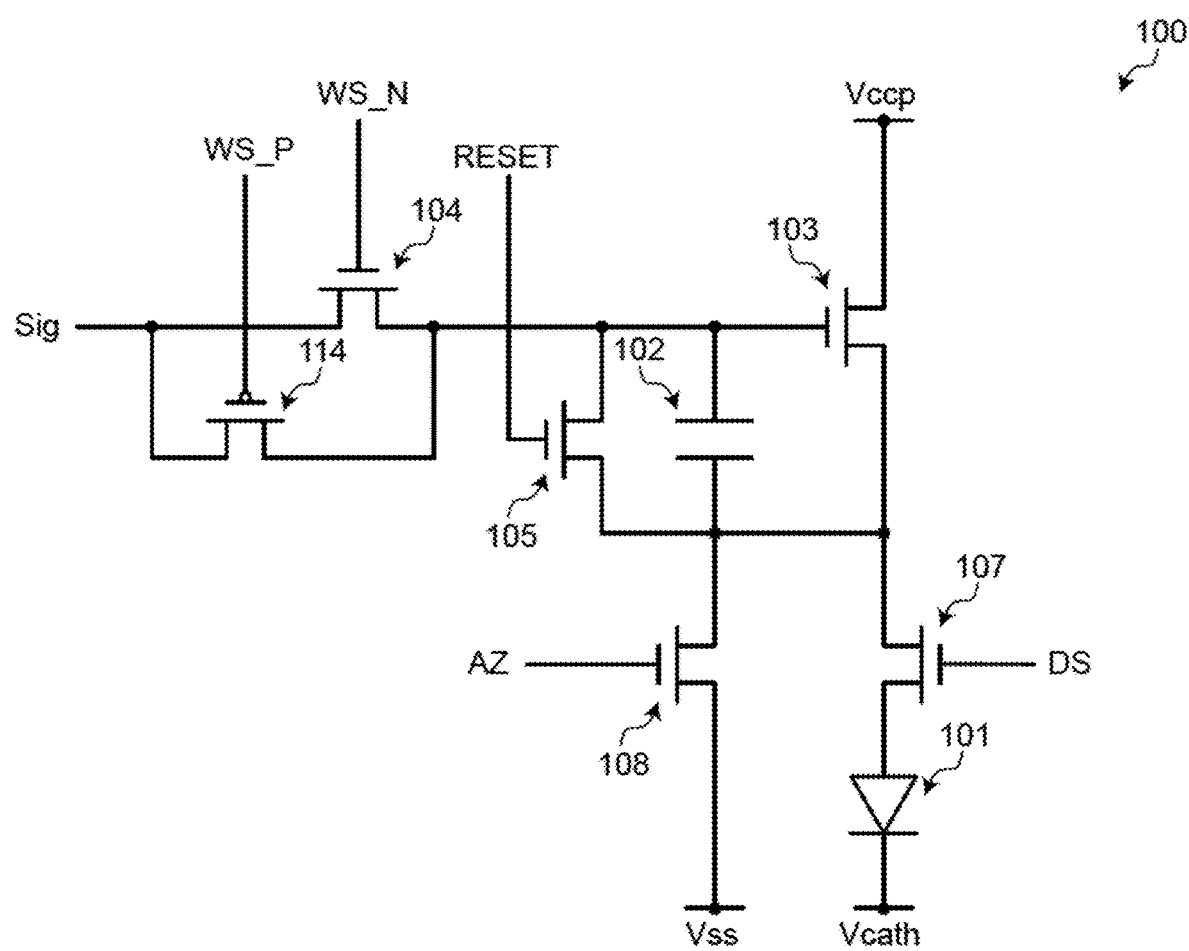
FIG. 20 is a diagram illustrating a configuration example of a pixel according to a third modification of the embodiment of the present disclosure.

FIG. 20 is a diagram illustrating a configuration example of a pixel according to a third modification of the embodiment of the present disclosure. The drawing is a circuit diagram illustrating a configuration example of the pixel 100, similarly to FIG. 2. The pixel 100 in the drawing is different from the pixel 100 in FIG. 2 in further including a sampling transistor 114, the light emission control transistor 107, and the switching transistor 108. A p-channel MOS transistor can be used as the sampling transistor 114.

A drain and a source of the sampling transistor 114 are connected to the drain and the source of the sampling transistor 104, respectively. The light emission control transistor 107 is connected between the source of the drive transistor 103 and the anode of the light emitting element 101. The holding capacitor 102 is connected between the gate and the source of the drive transistor 103. The drain and the source of the reset transistor 105 are connected to the gate and the source of the drive transistor 103, respectively. The drain of the switching transistor 108 is connected to the source of the drive transistor 103, and the source is connected to the power supply line Vss. A signal line WS_N and a signal line WS_P are connected to the gate of the sampling transistor 104 and a gate of the sampling transistor 401, respectively. The signal line DS is connected to the gate of the light emission control transistor 107. The signal line AZ is connected to the gate of the switching transistor 108.

In the pixel circuit of the drawing, when light emission control similar to that of the pixel circuit in FIG. 2 is performed, the reset transistor 105 is made conductive to discharge the holding capacitor 102. The drive transistor 103 can be brought into the non-conductive state, and the supply of the light emitting current to the light emitting element 101 can be stopped.

Figure 21A:
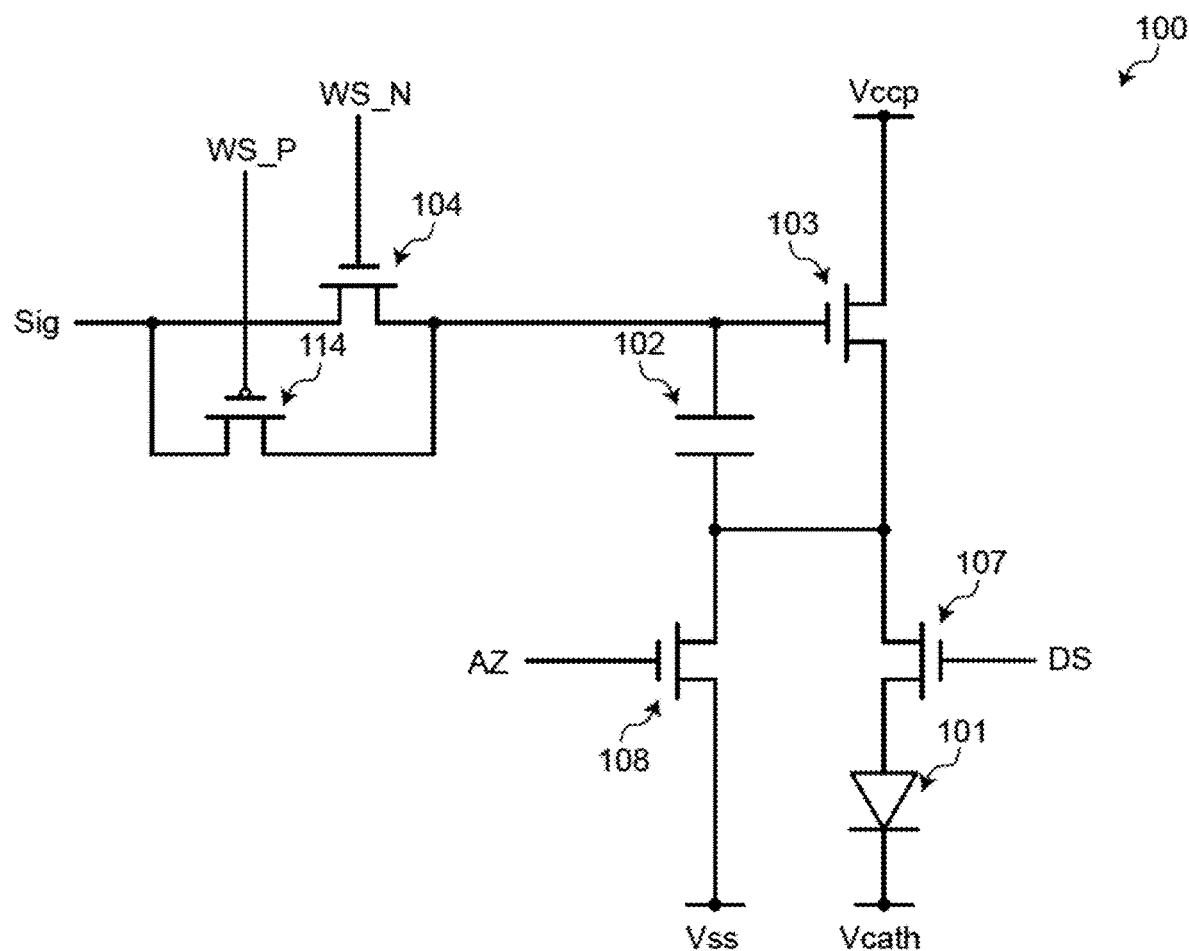
FIG. 21A is a diagram illustrating another configuration example of the pixel according to the third modification of the embodiment of the present disclosure.
Figure 21B:
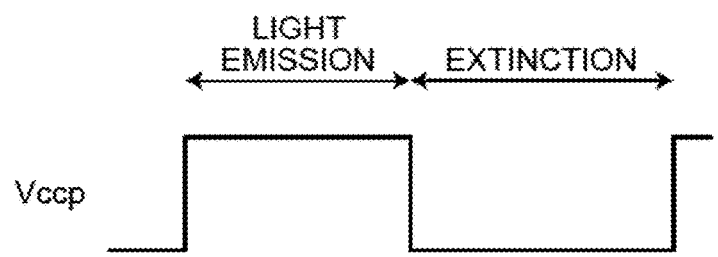
FIG. 21B is a diagram illustrating a drive waveform of another configuration example of the pixel according to the third modification of the embodiment of the present disclosure.

FIG. 21A is a diagram illustrating another configuration example of the pixel according to the third modification of the embodiment of the present disclosure. The pixel circuit in the drawing is obtained by omitting the reset transistor 105 from the pixel circuit in FIG. 20. In the pixel circuit of the drawing, light emission control similar to that of the pixel circuit in FIG. 7 can be performed by controlling the voltage of the power supply line Vccp.

FIG. 218 is a diagram illustrating a drive waveform of another configuration example of the pixel according to the third modification of the embodiment of the present disclosure. Light emission and extinction can be controlled by applying the power supply voltage of the waveform illustrated in the drawing to the pixel circuit. The voltage of the power supply line Vccp can be controlled by a switch element such as a MOS transistor. A control signal generated based on the light emission control selection signal can be input to a control terminal of the switch element.

Figure 22:
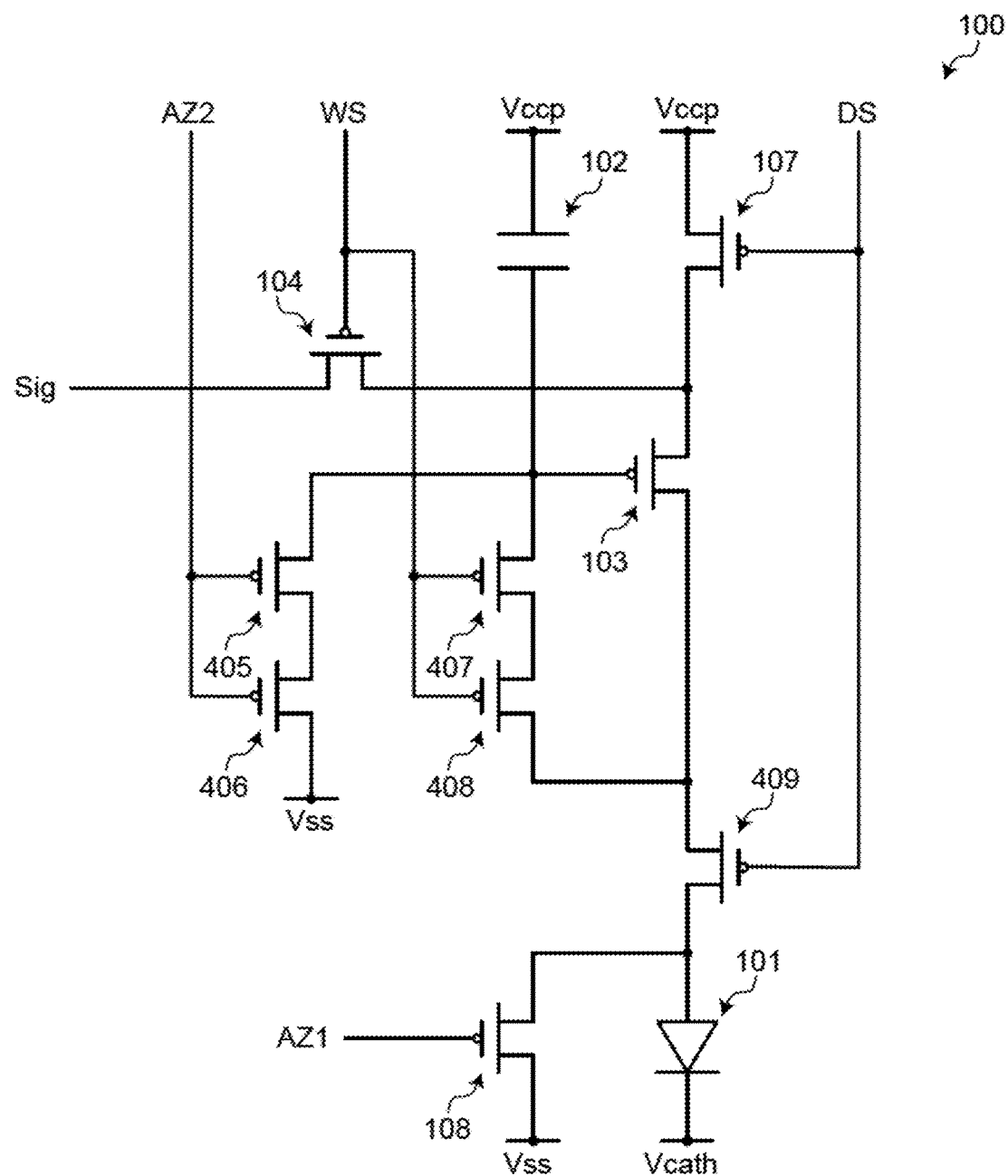
FIG. 22 is a diagram illustrating another configuration example of the pixel according to the third modification of the embodiment of the present disclosure.

FIG. 22 is a diagram illustrating another configuration example of the pixel according to the third modification of the embodiment of the present disclosure. The pixel circuit in the drawing includes the holding capacitor 102, the drive transistor 103, the sampling transistor 104, the light emission control transistor 107, the switching transistor 108, transistors 405 to 409, and the light emitting element 101. Note that the drive transistor 103, the sampling transistor 104, the light emission control transistor 107, the switching transistor 108, and the transistors 405 to 409 are p-channel MOS transistors. The gate of the sampling transistor 104 is connected to the signal line WS, the source is connected to the signal line Sig, and the drain is connected to the drain of the light emission control transistor 107 and the source of the drive transistor 103. The gate of the light emission control transistor 107 is connected to the signal line DS, the source is connected to the power line Vccp, and the drain is connected to the drain of the sampling transistor 104 and the source of the drive transistor 103. The gate of the drive transistor 103 is connected to a source of the transistor 405, a drain of the transistor 407, and the holding capacitor 102, the source is connected to the sampling transistor 104 and the drain of the light emission control transistor 107, and the drain is connected to sources of the transistor 408 and the transistor 409. One end of the holding capacitor 102 is connected to the power supply line Vccp, and the other end is connected to the gate of the drive transistor 103, the source of the transistor 405, and the drain of the transistor 407. The holding capacitor 102 may include two capacitors connected in parallel to each other. A gate of the transistor 405 is connected to the signal line AZ2, the source is connected to the gate of the drive transistor 103, the drain of the transistor 407, and the other end of the holding capacitor 102, and a drain is connected to a source of the transistor 406. A gate of the transistor 406 is connected to the signal line AZ2, the source is connected to the drain of the transistor 405, and a drain is connected to the power supply line Vss. A gate of the transistor 407 is connected to the signal line WS, the drain is connected to the gate of the drive transistor 103, the source of the transistor 405, and the other end of the holding capacitor 102, and a source is connected to a drain of the transistor 408. A gate of the transistor 408 is connected to the signal line WS, the drain is connected to the source of the transistor 407, and the source is connected to the drain of the drive transistor 103 and the source of the transistor 409. A gate of the transistor 409 is connected to the signal line DS, the source is connected to the drain of the drive transistor 103 and the source of the transistor 408, and a drain is connected to the source of the switching transistor 108 and the anode of the light emitting element 101. The gate of the switching transistor 108 is connected to the signal line AZ1, the source is connected to the drain of the transistor 409 and the anode of the light emitting element 101, and the drain is connected to the power supply line Vss.

With this configuration, the sampling transistor 104, the drive transistor 103, the transistor 408, and the transistor 407 are brought into an on-state in the pixel 100, so that a voltage across the holding capacitor 102 is set based on the image signal supplied from the signal line Sig. The light emission control transistor 107 and the transistor 409 are turned on and off based on a signal of the signal line DS. The drive transistor 103 causes a current corresponding to the voltage across the holding capacitor 102 to flow to the light emitting element 101 in a period in which the light emission control transistor 107 and the transistor 409 are in the on-state. The light emitting element 101 emits light based on the current supplied from the drive transistor 103. As described above, the pixel 100 emits light with luminance corresponding to a pixel signal. The transistor 405 and the transistor 406 are turned on and off based on a signal of the signal line AZ2. In a period in which the transistor 405 and the transistor 406 are in the on-state, the voltage of the gate of the drive transistor 103 is initialized by being set to the voltage of the power supply line Vss. The switching transistor 108 is turned on and off based on a signal of the signal line AZ1. In a period in which the switching transistor 108 is in the on-state, the voltage of the anode of the light emitting element 101 is initialized by being set to the voltage of the power supply line Vss.

Note that transistors using low temperature poly silicon (LTPS) may be applied to all the MOS transistors of the pixel circuits in FIGS. 2, 7, 18, 19, 20, 21A, and 22.

Furthermore, in the pixel circuit of FIG. 2, a transistor using an oxide semiconductor may be applied to at least one of the sampling transistor 104 and the reset transistor 105. Furthermore, in the pixel circuit of FIG. 7, a transistor using an oxide semiconductor may be applied to at least one of the sampling transistor 104 and the switching transistor 108. Furthermore, in the pixel circuit of FIG. 18, a transistor using an oxide semiconductor may be applied to at least one of the sampling transistor 104, the switching transistor 108, and the transistor 109. Furthermore, in the pixel circuit of FIG. 19, a transistor using an oxide semiconductor may be applied to at least one of the sampling transistor 104, the switching transistor 108, and the sampling transistor 110. Furthermore, in the pixel circuit of FIG. 20, a transistor using an oxide semiconductor may be applied to at least one of the sampling transistor 104, the reset transistor 105, the switching transistor 108, and the sampling transistor 114. Furthermore, in the pixel circuit of FIG. 21A, a transistor using an oxide semiconductor may be applied to at least one of the sampling transistor 104, the switching transistor 108, and the sampling transistor 114. Furthermore, in the pixel circuit of FIG. 22, a transistor using an oxide semiconductor may be applied to at least one of the switching transistor 108 and the transistors 405 to 408.

7. APPLICATION EXAMPLES

Application examples of the display system described in the above embodiments and modifications will be described.

Application Example 1

Figure 23:
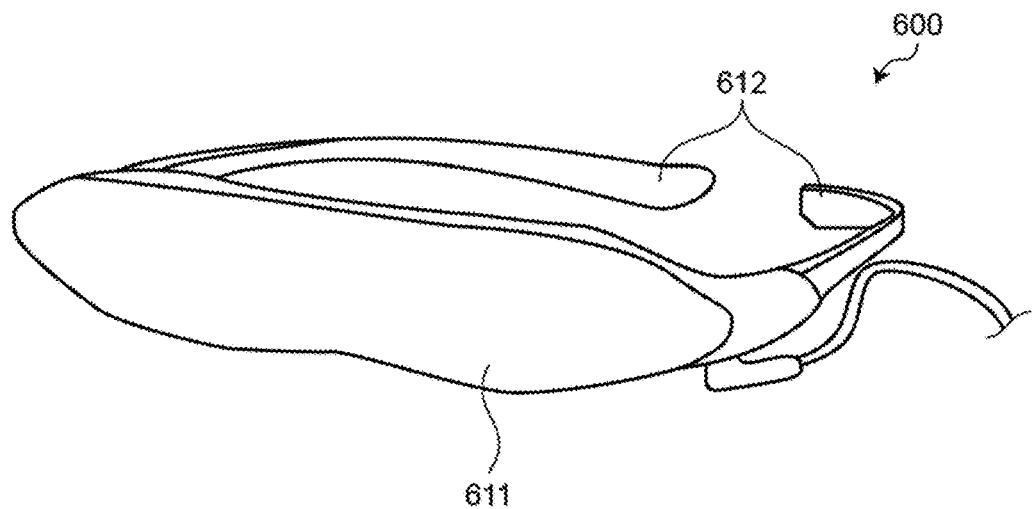
FIG. 23 is a diagram illustrating an example of an appearance of a head mounted display to which the technology according to the present disclosure can be applied.

FIG. 23 is a diagram illustrating an example of an appearance of a head mounted display 600 to which the technology according to the present disclosure can be applied. The head mounted display 600 includes, for example, ear hooking portions 612 to be worn on the head of a user on both sides of a display unit 611 having a glass shape. The technology according to the above embodiments and the like can be applied to such a head mounted display 600.

Application Example 2

Figure 24:
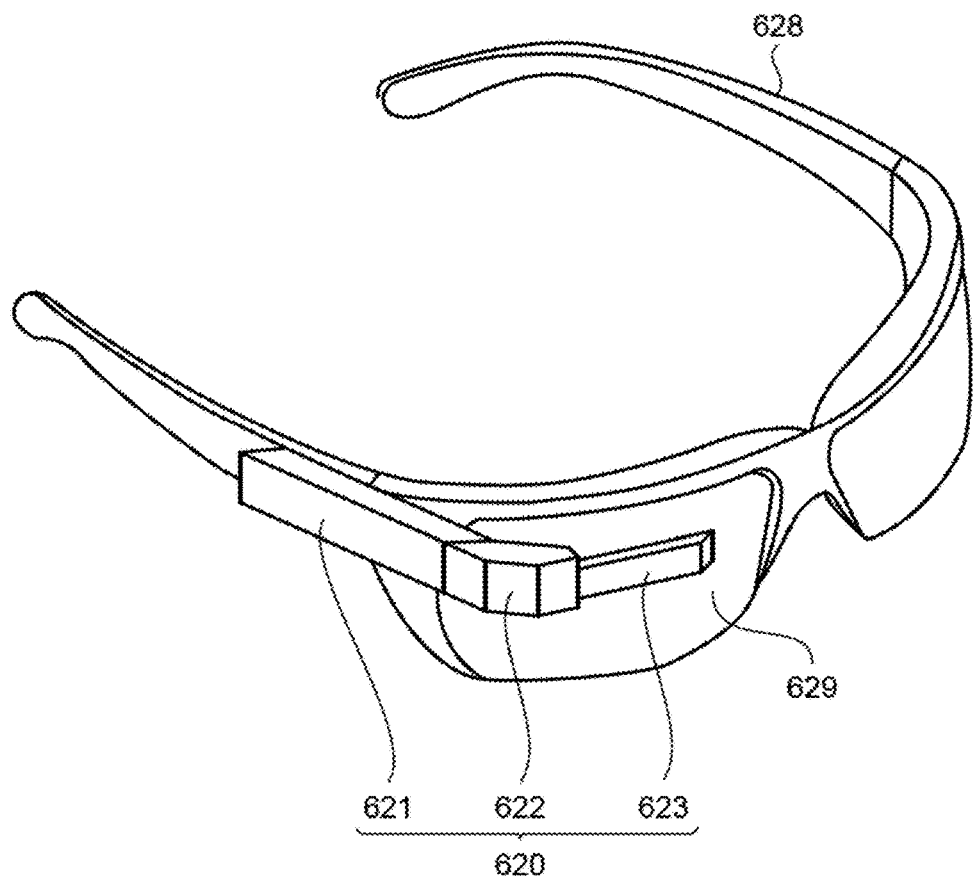
FIG. 24 is a diagram illustrating another example of an appearance of a head mounted display to which the technology according to the present disclosure can be applied.

FIG. 24 is a diagram illustrating another example of an appearance of a head mounted display 620 to which the technology according to the present disclosure can be applied. The head mounted display 620 is a transmissive head mounted display including a main body unit 621, an arm unit 622, and a lens barrel unit 623. The head mounted display 620 is mounted on glasses 628. The main body unit 621 includes a control board and a display unit for controlling the operation of the head mounted display 620. The display unit emits image light of a display image. The arm unit 622 connects the main body unit 621 and the lens barrel unit 623, and supports the lens barrel unit 623. The lens barrel unit 623 projects the image light supplied from the main body unit 621 via the arm unit 622 toward the user's eyes via a lens 629 of the glasses 628. The technology according to the above embodiments and the like can be applied to such a head mounted display 620.

Note that the head mounted display 620 is a so-called light guide plate-type head mounted display, but is not limited thereto, and may be, for example, a so-called birdbath type head mounted display. The birdbath type head mounted display includes, for example, a beam splitter and a partially transparent mirror. The beam splitter outputs light encoded with image information toward a mirror, and the mirror reflects the light toward the user's eyes. Both the beam splitter and the partially transparent mirror are partially transparent. As a result, light from the surrounding environment reaches the user's eyes.

Application Example 3

Figure 25A:
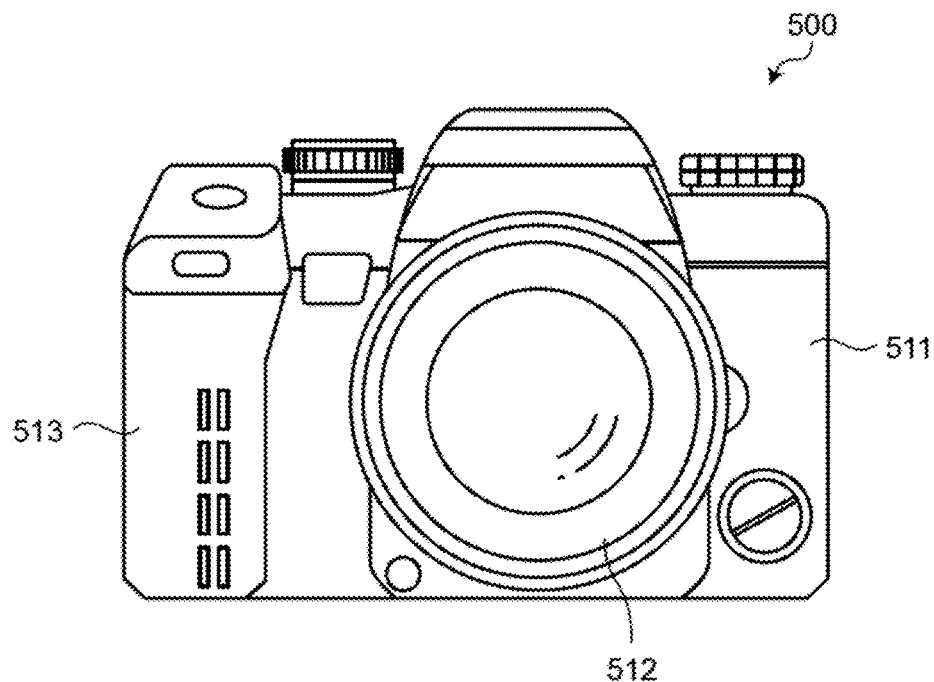
FIG. 25A is a diagram illustrating an example of an appearance of a digital still camera to which the technology according to the present disclosure can be applied.
Figure 25B:
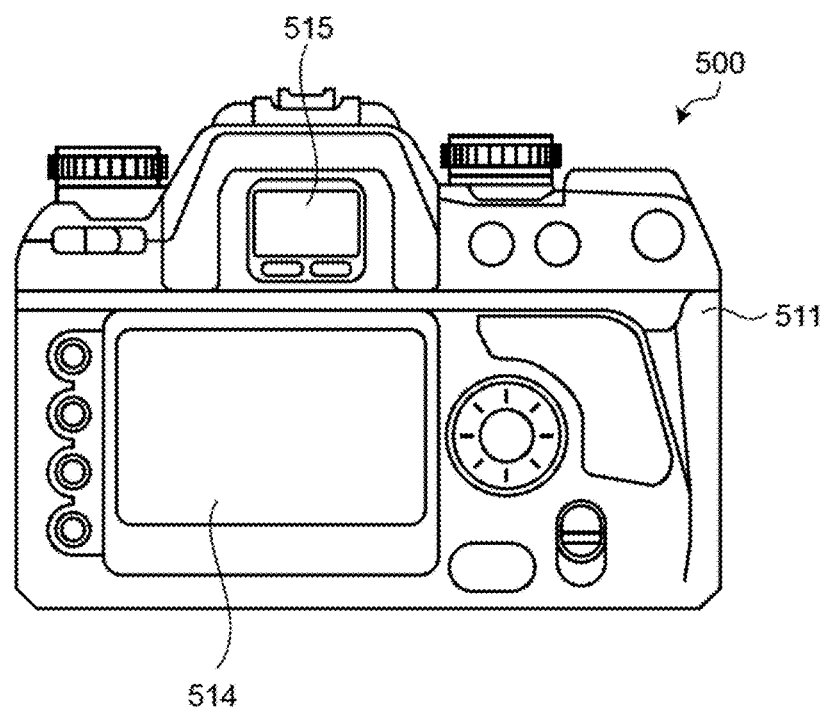
FIG. 25B is a diagram illustrating an example of the appearance of the digital still camera to which the technology according to the present disclosure can be applied.

FIGS. 25A and 25B are diagrams illustrating an example of an appearance of a digital still camera 600 to which the technology according to the present disclosure can be applied. FIG. 25A illustrates a front view, and FIG. 25B illustrates a rear view. The digital still camera 600 is a lens interchangeable single-lens reflex type camera, and includes a camera body portion (camera body) 131, an imaging lens unit 512, a grip portion 513, a monitor 514, and an electronic viewfinder 515. The imaging lens unit 312 is an interchangeable lens unit, and is provided substantially near the center of the front surface of the camera body portion 511. The grip portion 513 is provided on the left side of the front surface of the camera body portion 511, and a photographer grips the grip portion 513. The monitor 514 is provided on the left side of substantially the center of the back surface of the camera body portion 131. The electronic viewfinder 515 is provided on the upper part of the monitor 514 on the back surface of the camera body portion 131. By looking into the electronic viewfinder 515, the photographer can visually recognize an optical image of a subject guided from the imaging lens unit 512 and determine the composition. The technology according to the above embodiments and the like can be applied to the electronic viewfinder 515.

Application Example 4

Figure 26:
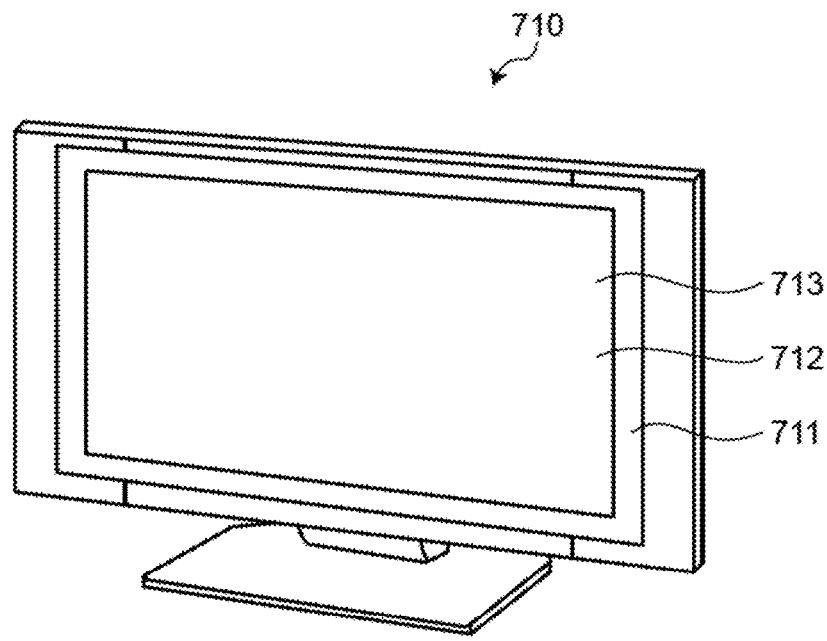
FIG. 26 is a diagram illustrating an example of an appearance of a television device to which the technology according to the present disclosure can be applied.

FIG. 26 is a diagram illustrating an example of an appearance of a television device 710 to which the technology according to the present disclosure can be applied. The television device 710 includes a video display screen unit 711 including a front panel 712 and a filter glass 713. The technology according to the above embodiments and the like can be applied to the video display screen unit 711.

Application Example 5

Figure 27:
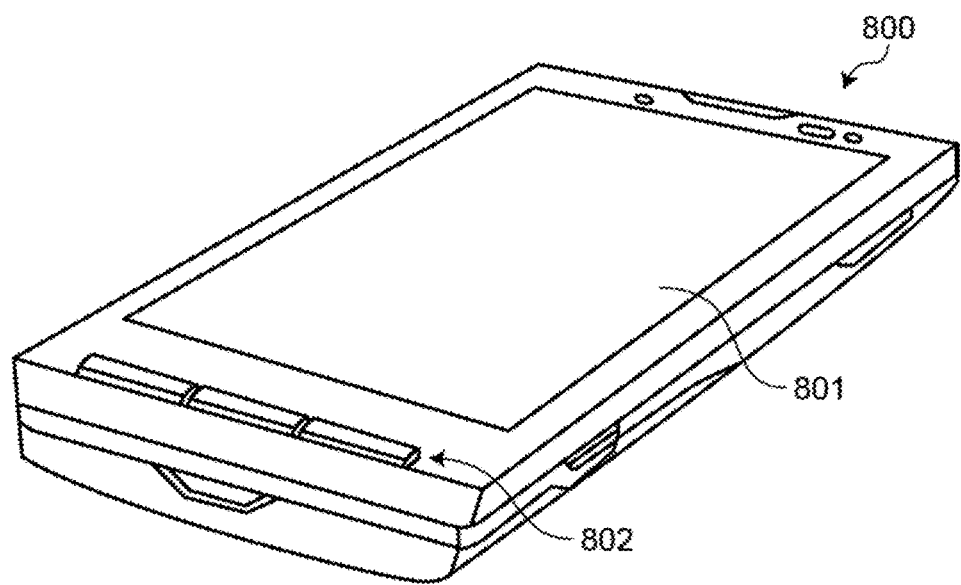
FIG. 27 is a diagram illustrating an example of an appearance of a smartphone to which the technology according to the present disclosure can be applied.

FIG. 27 is a diagram illustrating an example of an appearance of a smartphone 800 to which the technology according to the present disclosure can be applied. The smartphone 800 includes a display unit 801 that displays various types of information, and an operation unit 802 including a button or the like that receives an operation input by a user. The technology according to the above embodiments and the like can be applied to the display unit 801.

Application Example 6

Figure 28A:
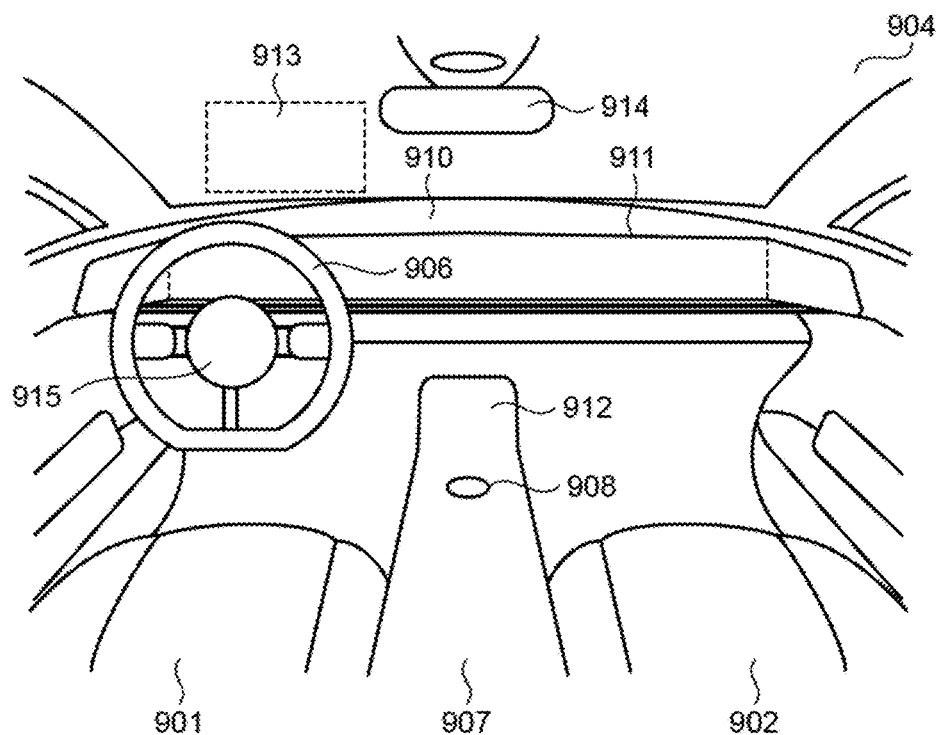
FIG. 28A is a diagram illustrating an example of a configuration of a vehicle to which the technology according to the present disclosure can be applied.
Figure 28B:
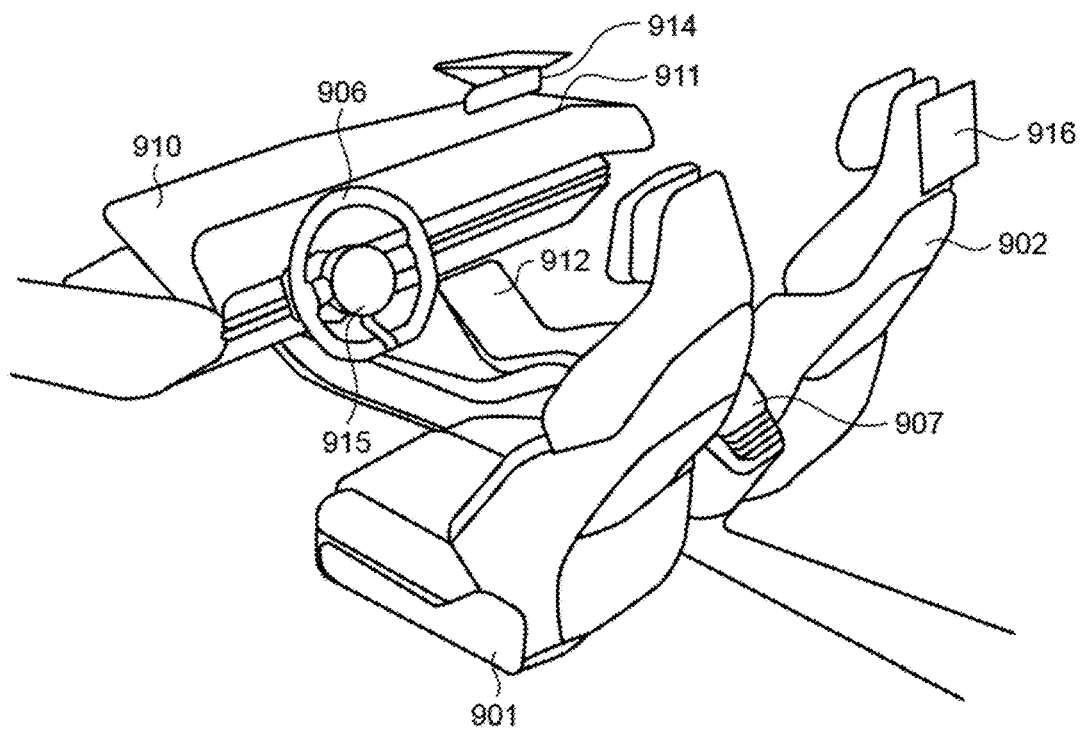
FIG. 28B is a diagram illustrating an example of the configuration of the vehicle to which the technology according to the present disclosure can be applied.

FIGS. 28A and 28B are diagrams illustrating an example of a configuration of a vehicle to which the technology according to the present disclosure can be applied. FIG. 28A illustrates an example of the interior of a vehicle 200 as viewed from the rear of the vehicle, and FIG. 28B illustrates an example of the interior of the vehicle 200 as viewed from the left rear of the vehicle.

The vehicle in FIGS. 28A and 28B includes a center display 911, a console display 912, a head-up display 913, a digital rear mirror 914, a steering wheel display 915, and a rear entertainment display 916.

The center display 911 is disposed on a dashboard 910 at a position facing a driver's seat 901 and a passenger seat 902. Although FIG. 28A illustrates an example of the center display 911 having a horizontally long shape extending from the driver's seat 901 side to the passenger seat 902 side, a screen size and an arrangement place of the center display 911 are not limited thereto. The center display 911 can display information detected by various sensors. As a specific example, the center display 911 can display a captured image captured by an image sensor, a distance image to an obstacle in front of or on a side of the vehicle measured by a ToF sensor, a body temperature of an occupant detected by an infrared sensor, and the like. The center display 911 can be used to display, for example, at least one of safety-related information, operation-related information, a life log, health-related information, authentication/identification-related information, and entertainment-related information.

The safety-related information is information such as doze detection, looking-away detection, mischief detection of a child riding together, the presence or absence of wearing a seat belt, and detection of leaving of an occupant based on a detection result of a sensor. The operation-related information is gesture information regarding the operation of the occupant detected using a sensor. The gesture may include operations of various facilities in the vehicle, and includes, for example, operations of an air conditioning facility, a navigation device, an audio visual (AV) device, and a lighting device. The life log includes life logs of all occupants. For example, the life log includes an action record of each occupant. By acquiring and storing the life log, it is possible to confirm the state of the occupant when an accident occurs. The health-related information includes a body temperature of the occupant detected using a temperature sensor and information on a health condition of the occupant estimated based on the detected body temperature. Alternatively, the information on the health condition of the occupant may be estimated based on the face of the occupant captured by the image sensor. Furthermore, the information on the health condition of the occupant may be estimated based on an answer content of the occupant obtained by talking with the occupant using an automatic voice. The authentication/identification-related information includes information such as a keyless entry function for performing face authentication using a sensor and an automatic adjustment function of a seat height and a position in face identification. The entertainment-related information includes operation information of the AV device by the occupant detected by a sensor and information on contents to be displayed and suitable for the occupant detected and recognized by the sensor.

The console display 912 can be used to display life log information, for example. The console display 912 is disposed near a shift lever 908 in a center console 907 between the driver's seat 901 and the passenger seat 902. The console display 912 can also display information detected by various sensors. Furthermore, the console display 912 may display an image of the periphery of the vehicle captured by the image sensor, or may display a distance image to an obstacle in the periphery of the vehicle.

The head-up display 913 is virtually displayed behind a windshield 904 in front of the driver's seat 901. The head-up display 913 can be used to display, for example, at least one of the safety-related information, the operation-related information, the life log, the health-related information, the authentication/identification-related information, and the entertainment-related information. Since the head-up display 913 is often virtually disposed in front of the driver's seat 901, it is suitable for displaying information directly related to the operation of the vehicle, such as the speed of the vehicle, the remaining amount of fuel, and the remaining amount of a battery.

The digital rear mirror 914 can display not only the rear of the vehicle but also the state of the occupant in a rear seat, and thus can be used to display the life log information of the occupant in the rear seat, for example.

The steering wheel display 915 is disposed at the center of a steering wheel 906 of the vehicle. The steering wheel display 915 can be used to display, for example, at least one of the safety-related information, the operation-related information, the life log, the health-related information, the authentication/identification-related information, and the entertainment-related information. In particular, since the steering wheel display 915 is close to the hand of the driver, it is suitable for displaying the life log information such as the body temperature of the driver and information regarding the operations of the AV device and the air conditioning facility.

The rear entertainment display 916 is attached to the back side of the driver's seat 901 or the passenger seat 902, and is for viewing by the occupant in the rear seat. The rear entertainment display 916 can be used to display, for example, at least one of the safety-related information, the operation-related information, the life log, the health-related information, the authentication/identification-related information, and the entertainment-related information. In particular, since the rear entertainment display 916 is just in front of the occupant in the rear seat, information related to the occupant in the rear seat is displayed. The rear entertainment display 916 can display, for example, the information regarding the operation of the AV device or the air conditioning facility. Furthermore, the rear entertainment display 916 may display a result of measuring the body temperature or the like of the occupant in the rear seat by a temperature sensor 5.

The technology according to the above embodiments and the like can be applied to the center display 911, the console display 912, the head-up display 913, the digital rear mirror 914, the steering wheel display 915, and the rear entertainment display 916.

Note that the effects described in the present specification are merely examples and are not limited, and other effects may be provided.

Note that the present technology can also have the following configurations.

(1) A display device comprising:
  a pixel array unit in which a plurality of pixels including a light emitting element and a pixel circuit that causes the light emitting element to emit light according to an image signal are arranged in a two-dimensional matrix;
  a plurality of row signal lines that are arranged for each of rows in the pixel array unit and transmit a control signal of the pixel circuit;
  a plurality of data lines that are arranged for each of columns in the pixel array unit and transmit the image signal; and
  a vertical drive unit that generates a control signal for line-sequentially driving the pixels of the pixel array unit and supplies the control signal to the pixels for each of the rows via the row signal line,
  wherein
  the vertical drive unit includes a decode circuit that outputs a selection signal to the row selected according to an input address signal and outputs a plurality of the selection signals according to a plurality of the address signals input every horizontal scanning period in the line-sequential driving, and generates the control signal based on the plurality of output selection signals.

(2) The display device according to the above (1), wherein the pixel circuit includes a holding capacitor that holds the image signal, and performs driving for supplying a light emission current corresponding to the image signal held in the holding capacitor to the light emitting element to cause the light emitting element to emit light, and the decode circuit generates a plurality of the selection signals including a write selection signal that is the selection signal representing the row on which writing for holding the image signal in the holding capacitor is performed and a light emission control selection signal that is the selection signal representing the row on which control of the light emission current is performed.

(3) The display device according to the above (2), wherein the vertical drive unit generates, based on the light emission control selection signal, a control signal for stopping the supply of the light emission current by discharging the holding capacitor.

(4) The display device according to the above (2), wherein the vertical drive unit generates, based on the light emission control selection signal, a control signal of a switch element that supplies the light emission current to the light emitting element.

(5) The display device according to the above (2), wherein the vertical drive unit generates, based on the light emission control selection signal, a control signal of a second switch element that performs control to stop the light emission of the light emitting element.

(6) The display device according to the above (2), wherein the vertical drive unit generates, based on the light emission control selection signal, a signal for controlling a voltage of a power supply line that is arranged for each of the rows and supplies the light emission current.

(7) The display device according to the above (2), wherein the decode circuit generates, as the light emission control selection signal, a light emission start control selection signal representing the row on which control to start the supply of the light emission current is performed and a light emission stop control selection signal representing the row on which control to stop the supply of the light emission current is performed, and the vertical drive unit generates the control signal based on the light emission start control selection signal and the light emission stop control selection signal.

(8) The display device according to any one of the above (1) to (7), wherein the vertical drive unit further includes a latch circuit that is arranged for each of the rows and holds the selection signal in synchronization with a clock signal, and generates the control signal based on the selection signal held in the latch circuit.

(9) The display device according to the above (8), wherein the vertical drive unit performs control to stop supply of the clock signal in a vertical blanking period in the line-sequential driving.

(10) The display device according to any one of the above (1) to (9), wherein in the vertical drive unit, an address signal not corresponding to the row of the pixel array unit is input to the decode circuit in a vertical blanking period in the line-sequential driving.

REFERENCE SIGNS LIST

10 DISPLAY DEVICE
20 PIXEL ARRAY UNIT
21 ROW SIGNAL LINE
22 DATA LINE
30 VERTICAL DRIVE UNIT
31 DECODE CIRCUIT
32, 33, 37 LATCH CIRCUIT
100 PIXEL
101 LIGHT EMITTING ELEMENT
102 HOLDING CAPACITOR
103 DRIVE TRANSISTOR
104, 110, 114 SAMPLING TRANSISTOR
105 RESET TRANSISTOR
107 LIGHT EMISSION CONTROL TRANSISTOR
108 SWITCHING TRANSISTOR

The invention claimed is:

1. A display device comprising:

a pixel array in which a plurality of pixels including a light emitting element and a pixel circuit that causes the light emitting element to emit light according to an image signal are arranged in a two-dimensional matrix;

a plurality of row signal lines that are arranged for each of rows in the pixel array and respectively transmit first control signals from the pixel circuit;

a plurality of data lines that are arranged for each of columns in the pixel array and transmit the image signal; and a vertical drive circuit that generates second control signals for line-sequentially driving the pixels of the pixel array and supplies the second control signals to the pixels for each of the rows via the row signal lines, wherein the vertical drive circuit includes a decode circuit that outputs a single selection signal to a corresponding row selected according to an input address signal and outputs a plurality of selection signals according to a plurality of the address signals input every horizontal scanning period in the line-sequential driving, and generates the second control signals based on the plurality of selection signals, the pixel circuit includes a holding capacitor that holds the image signal, and performs driving for supplying a light emission current corresponding to the image signal held in the holding capacitor to the light emitting element to cause the light emitting element to emit light, and the plurality of selection signals include a write selection signal that represents a corresponding row on which writing for holding the image signal in the holding capacitor is performed and a light emission control selection signal that represents a corresponding row on which control of the light emission current is performed.

2. The display device according to claim 1, wherein the vertical drive circuit generates, based on the light emission control selection signal, a corresponding control signal for stopping supply of the light emission current by discharging the holding capacitor.

3. The display device according to claim 1, wherein the vertical drive circuit generates, based on the light emission control selection signal, a corresponding control signal of a switch element that supplies the light emission current to the light emitting element.

4. The display device according to claim 1, wherein the vertical drive circuit generates, based on the light emission control selection signal, a corresponding control signal of a second switch element that performs control to stop light emission of the light emitting element.

5. The display device according to claim 1, wherein the vertical drive circuit generates, based on the light emission control selection signal, a corresponding signal for controlling a voltage of a power supply line that is arranged for each of the rows and supplies the light emission current.

6. The display device according to claim 1, wherein the decode circuit generates, as the light emission control selection signal, a light emission start control selection signal representing a corresponding row on which control to start the supply of the light emission current is performed and a light emission stop control selection signal representing a corresponding row on which control to stop the supply of the light emission current is performed, and the vertical drive circuit generates a corresponding control signal based on the light emission start control selection signal and the light emission stop control selection signal.

7. The display device according to claim 1, wherein in the vertical drive circuit, an address signal not corresponding to a corresponding row of the pixel array is input to the decode circuit in a vertical blanking period in the line-sequential driving.

8. A display device comprising:

a pixel array in which a plurality of pixels including a light emitting element and a pixel circuit that causes the light emitting element to emit light according to an image signal are arranged in a two-dimensional matrix;

a plurality of row signal lines that are arranged for each of rows in the pixel array and respectively transmit first control signals from the pixel circuit;

a plurality of data lines that are arranged for each of columns in the pixel array and transmit the image signal; and a vertical drive circuit that generates second control signals for line-sequentially driving the pixels of the pixel array and supplies the second control signals to the pixels for each of the rows via the row signal lines, wherein the vertical drive circuit includes a decode circuit that outputs a single selection signal to a corresponding row selected according to an input address signal and outputs a plurality of selection signals according to a plurality of address signals input every horizontal scanning period in the line-sequential driving, and generates the second control signals based on the plurality of selection signals, and the vertical drive circuit includes a latch circuit that is arranged for each of the rows and holds a corresponding selection signal in synchronization with a clock signal, and generates a corresponding control signal based on the corresponding selection signal held in the latch circuit.

9. The display device according to claim 8, wherein the vertical drive circuit performs control to stop supply of the clock signal in a vertical blanking period in the line-sequential driving.

* * * * *